(12) United States Patent
Taki

(10) Patent No.: US 10,300,641 B2
(45) Date of Patent: May 28, 2019

(54) CYLINDRICAL ARTICLE MADE OF FIBER-REINFORCED RESIN MATERIAL, INJECTION MOLDING MOLD THEREOF, AND INJECTION MOLDING METHOD

(71) Applicant: ENPLAS CORPORATION, Saitama (JP)

(72) Inventor: Kenjiro Taki, Saitama (JP)

(73) Assignee: ENPLAS CORPORATION, Saitama (JP)

(*) Notice: Subject to any disclaimer, the term of this patent is extended or adjusted under 35 U.S.C. 154(b) by 0 days.

(21) Appl. No.: 15/552,728

(22) PCT Filed: Feb. 19, 2016

(86) PCT No.: PCT/JP2016/054797
§ 371 (c)(1),
(2) Date: Aug. 22, 2017

(87) PCT Pub. No.: WO2016/136601
PCT Pub. Date: Sep. 1, 2016

(65) Prior Publication Data
US 2018/0029261 A1    Feb. 1, 2018

(30) Foreign Application Priority Data
Feb. 23, 2015    (JP) ................................ 2015-032469

(51) Int. Cl.
*B29C 45/00*    (2006.01)
*B29C 45/26*    (2006.01)
(Continued)

(52) U.S. Cl.
CPC ...... *B29C 45/0046* (2013.01); *B29C 45/0005* (2013.01); *B29C 45/0025* (2013.01);
(Continued)

(58) Field of Classification Search
CPC ............ B29C 45/0046; B29C 45/0005; B29C 45/261; B29C 45/2708; B29C 45/0025;
(Continued)

(56) References Cited

U.S. PATENT DOCUMENTS 5,637,328 A    6/1997    Shah et al.

FOREIGN PATENT DOCUMENTS

| JP | 5-44204 | 6/1993 |
| JP | 6-226764 | 8/1994 |

(Continued)

OTHER PUBLICATIONS

International Search Report dated May 17, 2016 in International (PCT) Application No. PCT/JP2016/054797.

*Primary Examiner* — Michael C Miggins
(74) *Attorney, Agent, or Firm* — Wenderoth, Lind & Ponack, L.L.P.

(57) ABSTRACT

A molten resin containing reinforcing fibers is injected from a gate into a cavity formed between an external piece and a center pin, and the molten resins containing the reinforcing fibers join together in the cavity. Thus, a weld line is formed in the molten resin containing the reinforcing fibers in the cavity. With this injection molding mold, moving the external piece with respect to the center pin changes an interval with the center pin. This forcibly causes the molten resin containing the reinforcing fibers in the cavity to flow and disturbs directions of the reinforcing fibers at the weld line. Consequently, the reinforcing fibers at the weld line and near the weld line in a cylindrical article tangle, improving strength at a part where the weld line is formed in the cylindrical article.

7 Claims, 15 Drawing Sheets

(51) Int. Cl.
*B29C 45/27* (2006.01)
*B29K 105/12* (2006.01)
*B29K 309/08* (2006.01)
*B29C 45/33* (2006.01)

(52) U.S. Cl.
CPC ........ *B29C 45/261* (2013.01); *B29C 45/2708* (2013.01); *B29C 45/33* (2013.01); *B29C 2045/0027* (2013.01); *B29C 2045/0031* (2013.01); *B29K 2105/12* (2013.01); *B29K 2309/08* (2013.01)

(58) Field of Classification Search
CPC ............ B29C 45/33; B29C 2045/0027; B29C 2045/0031; B29K 2105/12; B29K 2309/08
See application file for complete search history.

(56) References Cited

FOREIGN PATENT DOCUMENTS

| | | | | |
|---|---|---|---|---|
| JP | 8-127076 | | 5/1996 | |
| JP | 2000-167863 | | 6/2000 | |
| JP | 3383971 | | 12/2002 | |
| JP | 2003-276058 | | 9/2003 | |
| JP | 2007-160683 | * | 6/2007 | ............ B29C 45/14 |
| JP | 2010-59316 | | 3/2010 | |
| JP | 2014-195941 | | 10/2014 | |

* cited by examiner

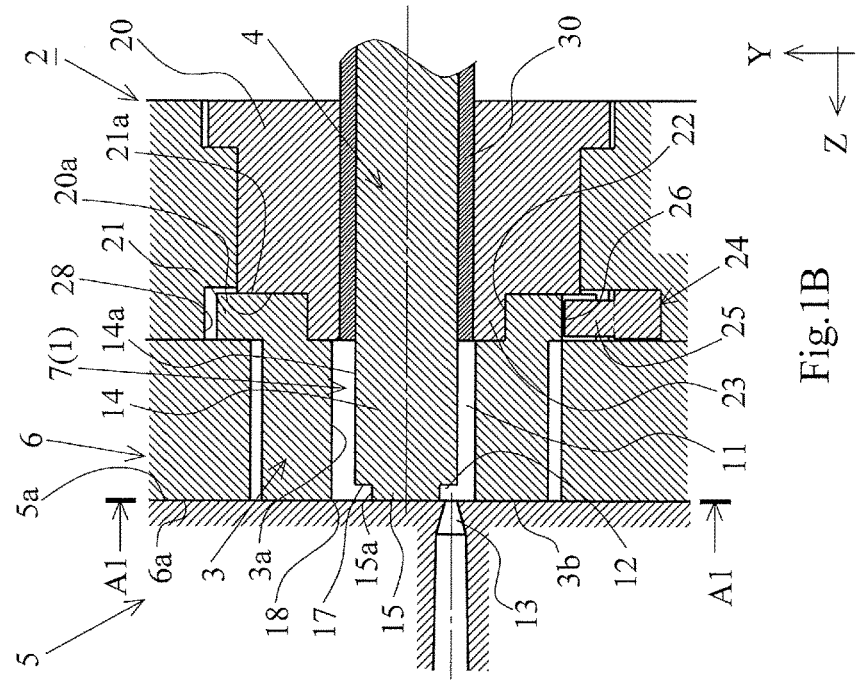
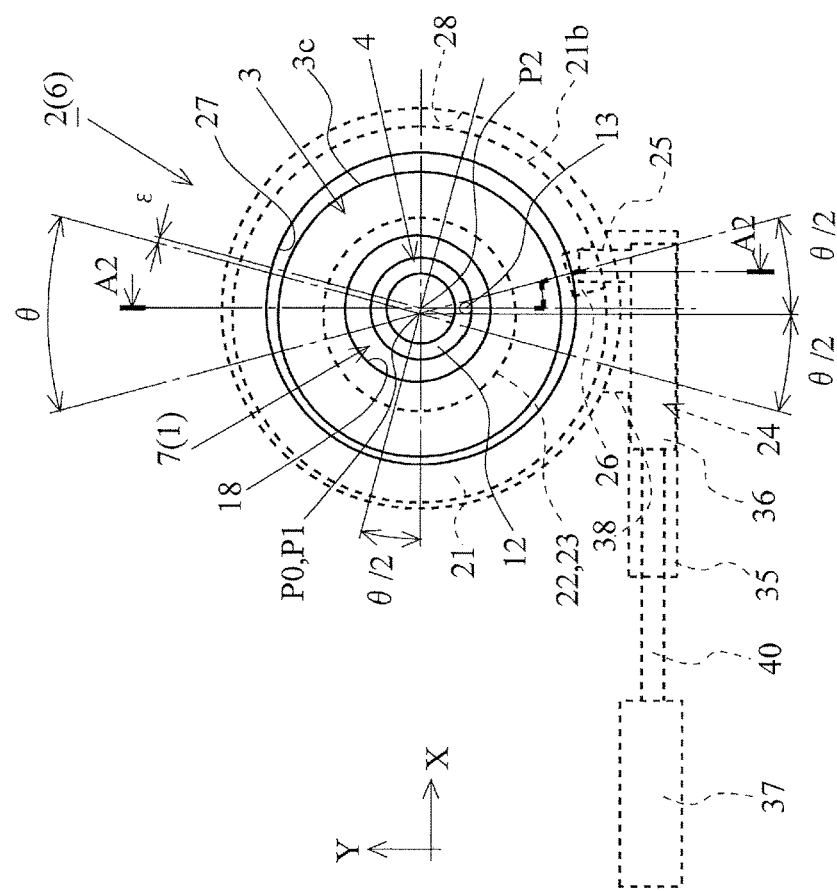
Fig.1A
Fig.1B

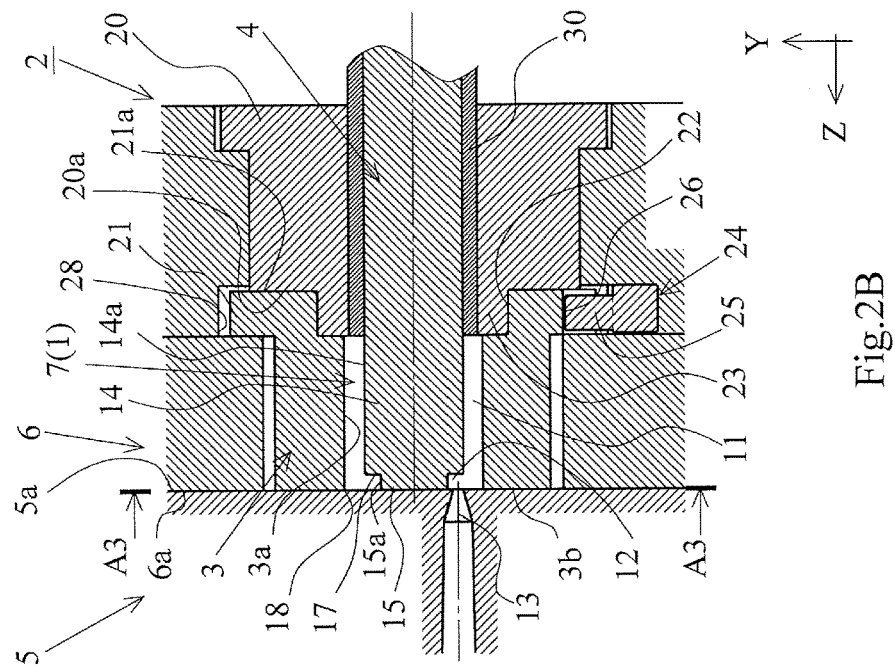
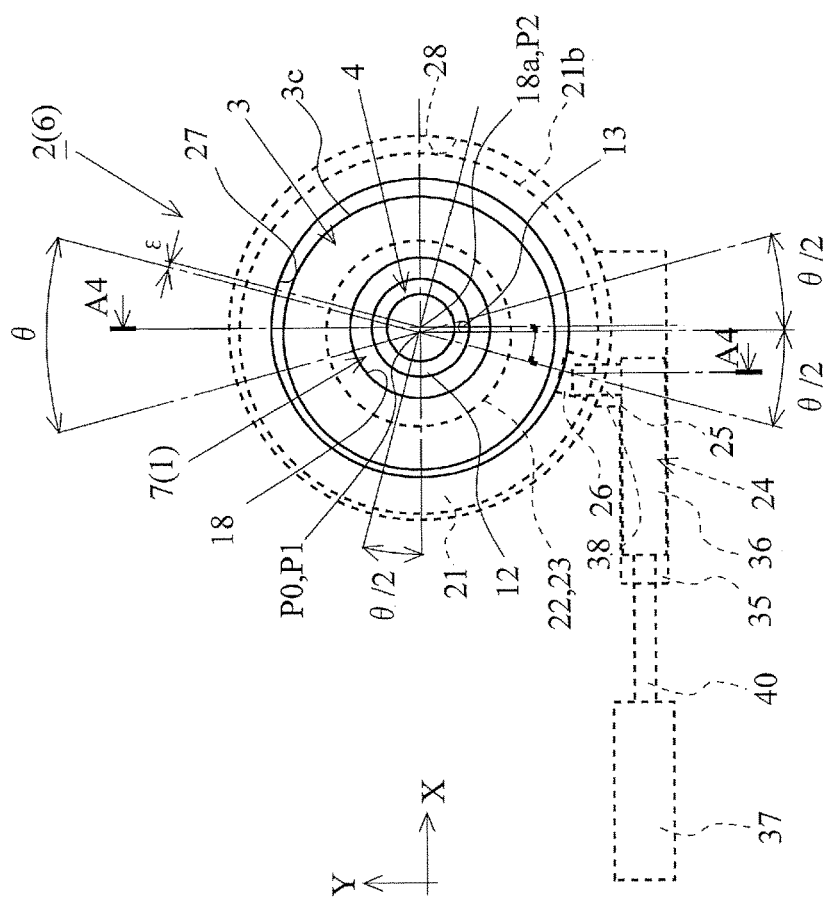
Fig.2A
Fig.2B

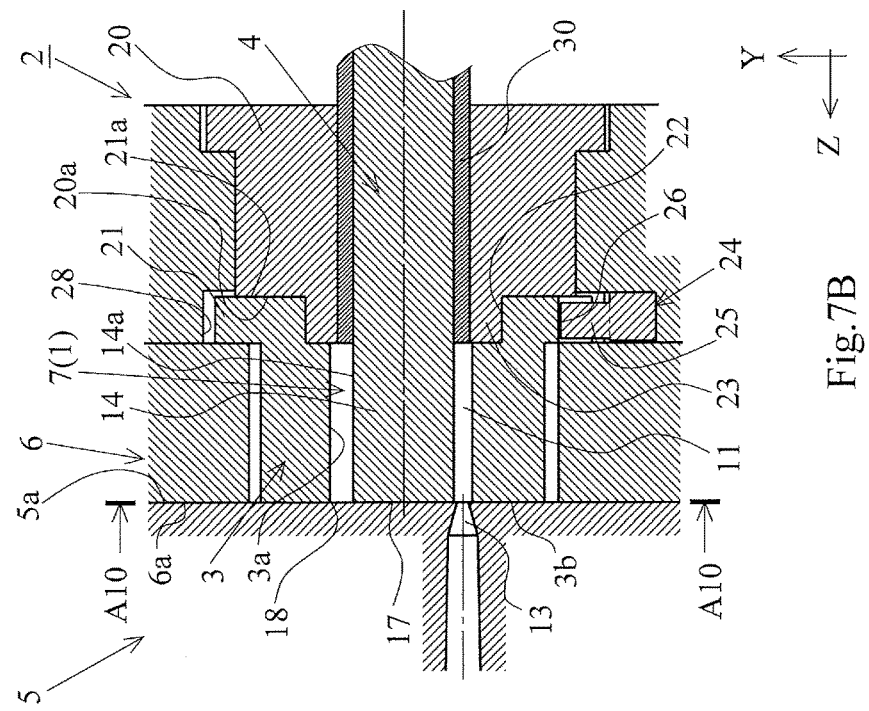
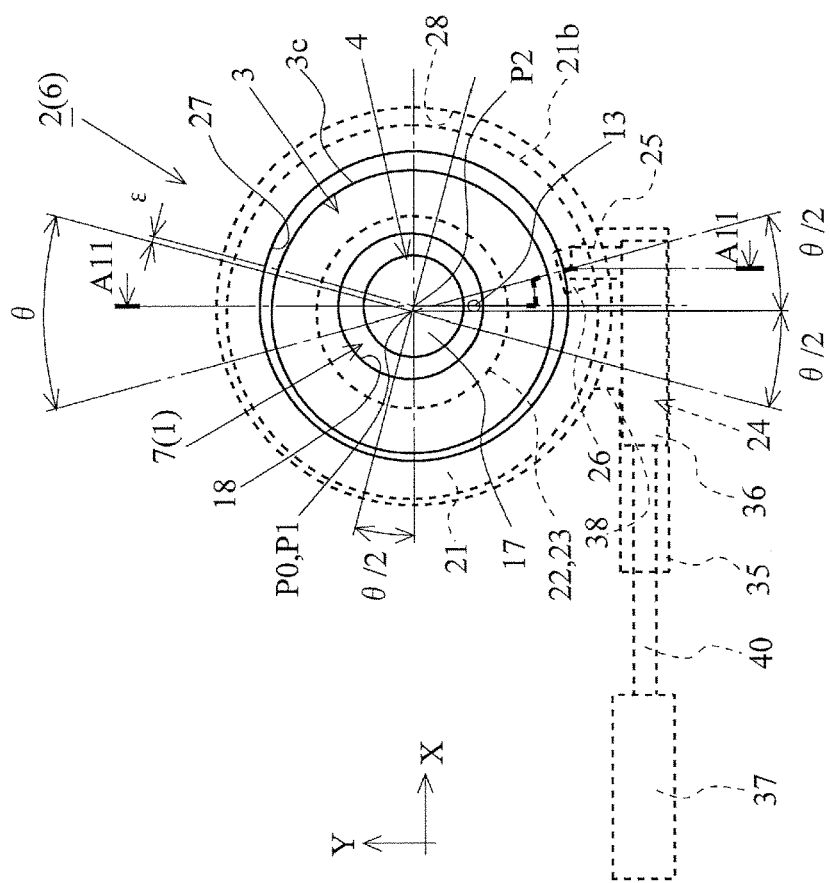
Fig.7A
Fig.7B

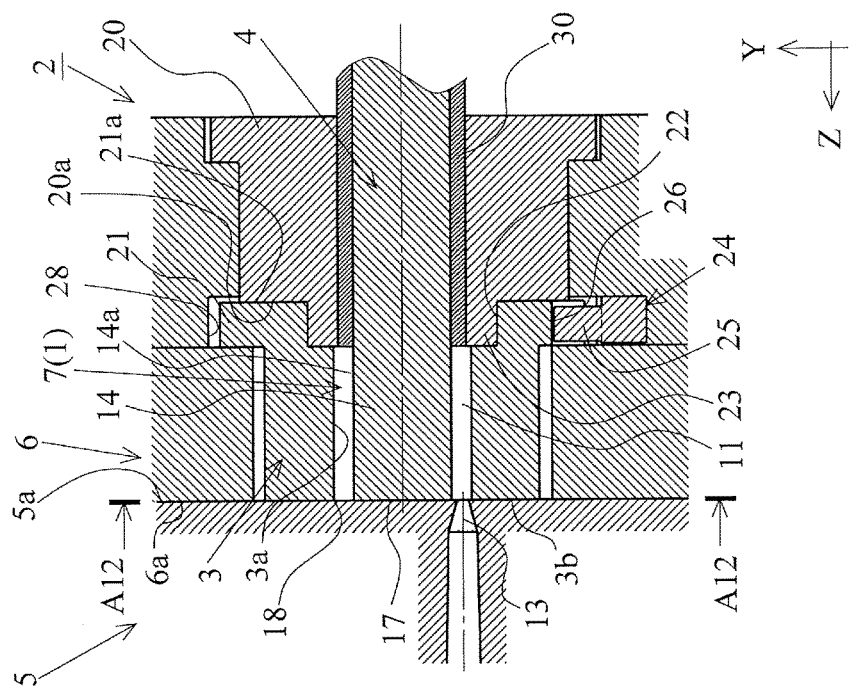
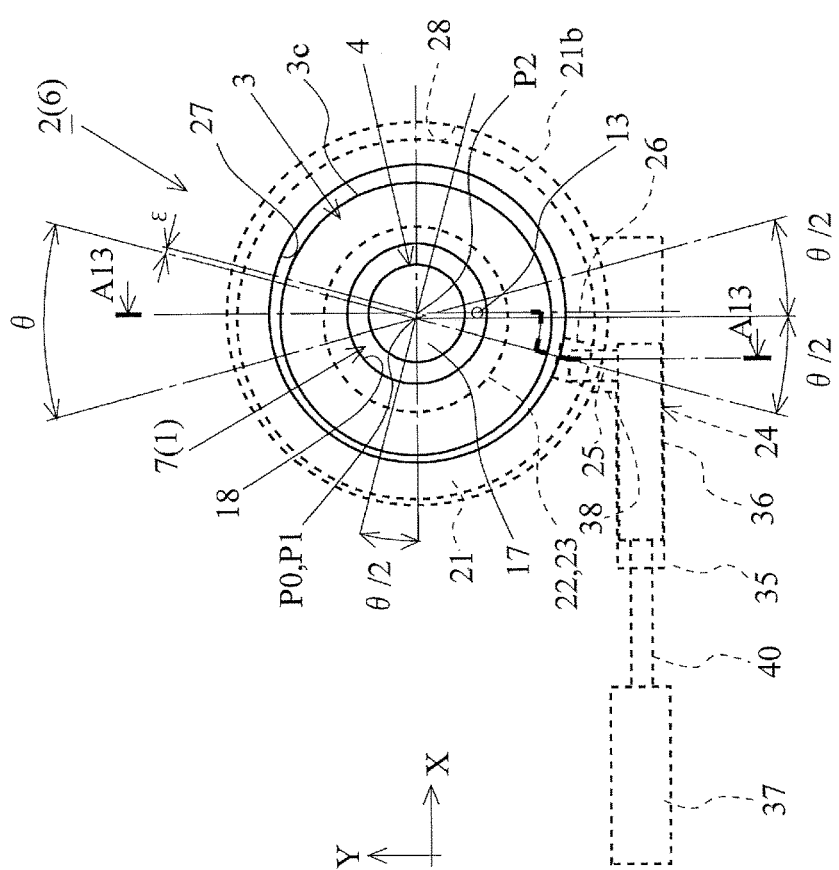
Fig.8A
Fig.8B

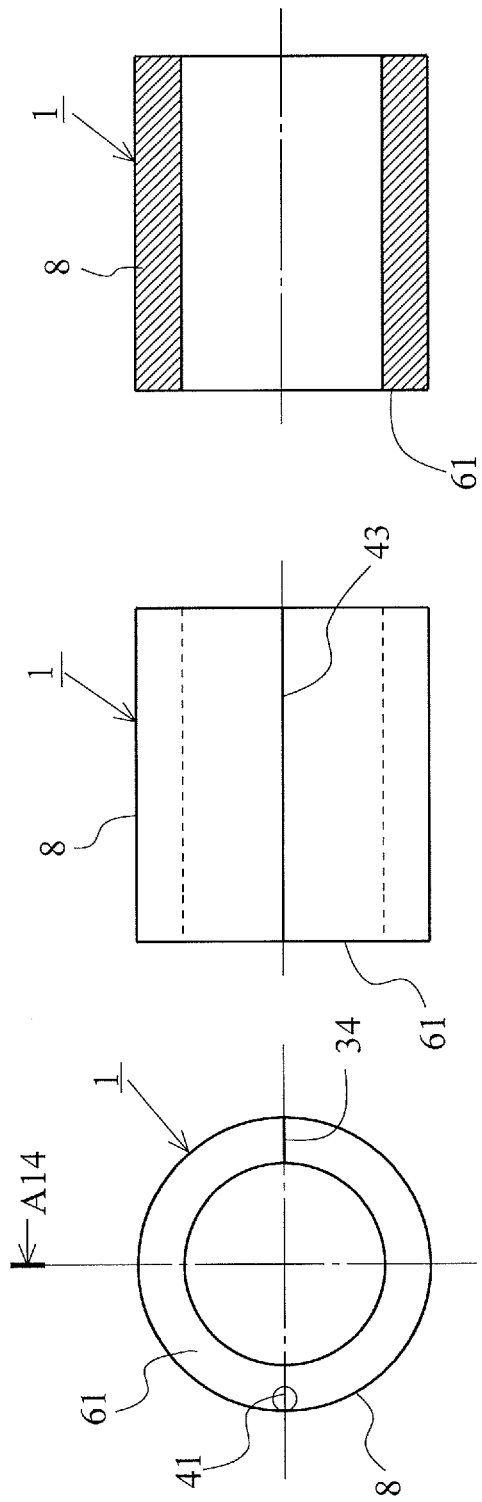

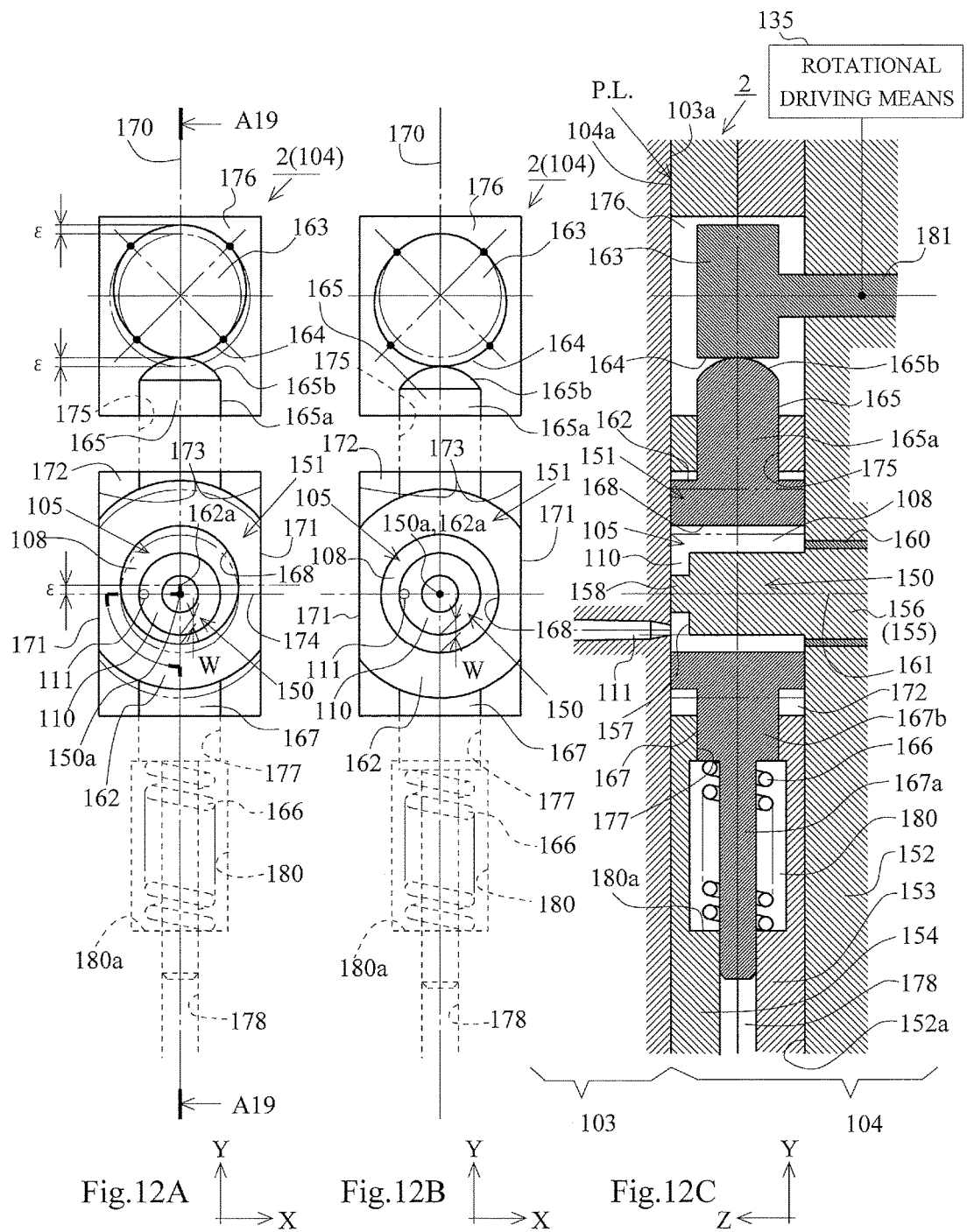

CYLINDRICAL ARTICLE MADE OF FIBER-REINFORCED RESIN MATERIAL, INJECTION MOLDING MOLD THEREOF, AND INJECTION MOLDING METHOD

TECHNICAL FIELD

The present invention relates to a cylindrical article made of a fiber-reinforced resin material, an injection molding mold thereof, and an injection molding method to improve strength at a part where a weld line generated by injection molding is formed.

BACKGROUND ART

As illustrated in FIG. 13, there has been conventionally known an injection molding method (see Japanese Patent No. 3383971) that injects a molten resin from a pinpoint gate 1000 into a cavity 1002 in a mold 1001 to manufacture a cylindrical article 1003 (see FIG. 14) to which a shape of the cavity 1002 is transferred.

However, as illustrated in FIG. 13 and FIG. 14, after the molten resin is injected from the pinpoint gate 1000 into the cavity 1002 in the mold 1001, the conventional injection molding method forms a weld line 1004 at a part where the molten resins join together in the cavity 1002. A problem therefore occurs in that this weld line 1004 deteriorates strength of the cylindrical article 1003, as has been pointed out. Especially, in the cylindrical article 1003 on which the injection molding has been performed using a fiber-reinforced resin material, reinforcing fibers 1005 at the weld line 1004 are arranged in one direction (molten resin flowing direction) (see FIG. 15). This has a problem that press-fitting the cylindrical article 1003 to a shaft is likely to cause a crack at a part where the weld line 1004 is formed.

Therefore, an object of the present invention is to provide a cylindrical article made of a fiber-reinforced resin material, an injection molding mold thereof, and an injection molding method to improve strength of a part where a weld line is formed.

SUMMARY OF THE INVENTION

The present invention relates to an injection molding mold 2 for a cylindrical article 1 where a molten resin containing reinforcing fibers is injected from a gate 13, 111 into a cavity 7, 105 to join the molten resins containing the reinforcing fibers together in the cavity 7, 105 to form a weld line 34. The injection molding mold 2 for the cylindrical article 1 includes a center pin 4, 150 shaping an inner peripheral surface side of the cylindrical article 1 and an external piece 3, 151 shaping an outer peripheral surface side of the cylindrical article 1. The cavity 7, 105 is formed between the center pin 4, 150 and the external piece 3, 151. The external piece 3, 151 is moved with respect to the center pin 4, 150 to change an interval with the center pin 4, 150, to forcibly cause the molten resin containing the reinforcing fibers in the cavity 7, 105 to flow, and to disturb directions of the reinforcing fibers at the weld line 34.

The present invention relates to an injection molding method for a cylindrical article 1 that injects a molten resin containing reinforcing fibers from a gate 13, 111 into a cavity 7, 105 to join the molten resins containing the reinforcing fibers together in the cavity 7, 105 to form a weld line 34. The injection molding method for the cylindrical article includes installing, forming, and moving. The installing step includes installing a center pin 4, 150 shaping an inner peripheral surface side of the cylindrical article 1 and an external piece 3, 151 shaping an outer peripheral surface side of the cylindrical article 1. The forming step includes forming the cavity 7, 105 between the center pin 4, 150 and the external piece 3, 151. The moving step includes moving the external piece 3, 151 with respect to the center pin 4, 150 to change an interval with the center pin 3, 151, to forcibly cause the molten resin containing the reinforcing fibers in the cavity 7, 105 to flow, and to disturb directions of the reinforcing fibers at the weld line 34.

The present invention relates to a cylindrical article 1 made of a fiber-reinforced resin material where a molten resin containing reinforcing fibers is injected from a gate 13, 111 into a cavity 7, 105 to join the molten resins containing the reinforcing fibers together in the cavity 7, 105 to form a weld line 34. The cylindrical article 1 made of the fiber-reinforced resin material includes a center pin 4, 150 shaping an inner peripheral surface side of the cylindrical article 1 and an external piece 3, 151 shaping an outer peripheral surface side of the cylindrical article 1. The cavity 7, 105 is formed between the center pin 4, 150 and the external piece 3, 151. The external piece 3, 151 is moved with respect to the center pin 4, 150 to change an interval with the center pin 4, 150, to forcibly cause the molten resin containing the reinforcing fibers in the cavity 7, 105 to flow, and to disturb directions of the reinforcing fibers at the weld line 34.

Advantageous Effects of Invention

With the present invention, the directions of the reinforcing fibers at the weld line and near the weld line in the injection-molded cylindrical article are disturbed. The reinforcing fibers at the weld line and near the weld line in the cylindrical article tangle. Accordingly, the weld line in the cylindrical article is less likely to be noticeable, and the strength at the part where the weld line is formed in the cylindrical article is improved.

BRIEF DESCRIPTION OF DRAWINGS

FIGS. 1A and 1B are drawings illustrating a structure of an injection molding mold according to a first embodiment of the present invention and are drawings illustrating the structure of the injection molding mold in an injection standby state;

FIGS. 2A and 2B are drawings illustrating the structure of the injection molding mold according to the first embodiment of the present invention and are drawings illustrating the structure of the injection molding mold in the case where an external piece in the injection standby state is turned eccentrically with respect to a center pin clockwise by a predetermined angle (θ);

FIG. 4(a) is a front view of the cylindrical article, FIG. 4(b) is a side view of the cylindrical article, and FIG. 4(c) is a cross-sectional view of the cylindrical article illustrated taken along a line A5-A5 in FIG. 4(a);

FIGS. 7A and 7B are drawings illustrating a structure of an injection molding mold according to a third embodiment of the present invention and are drawings illustrating a modification of the injection molding mold illustrated in FIG. 1;

FIGS. 8A and 8B are drawings illustrating the structure of an injection molding mold according to the third embodiment of the present invention and are drawings illustrating the structure of an injection molding mold 2 in the case where the external piece in the injection standby state in FIG. 7 is turned eccentrically with respect to the center pin clockwise by the predetermined angle;

FIGS. 9A-9C are drawings illustrating a cylindrical article injection-molded with the injection molding mold according to the third embodiment of the present invention. FIG. 9(a) is a front view of the cylindrical article, FIG. 9(b) is a side view of the cylindrical article, and FIG. 9(c) is a cross-sectional view of the cylindrical article illustrated taken along a line A14-A14 in FIG. 9(a);

FIGS. 12A-12C are drawings illustrating an injection molding mold according to a fifth embodiment of the present invention;

DETAILED DESCRIPTION OF THE INVENTION

The following describes embodiments of the present invention in detail with reference to the drawings.

First Embodiment (Injection Molding Mold for Cylindrical Article)

FIG. 1 and FIG. 2 are drawings illustrating an injection molding mold 2 for a cylindrical article 1 according to the first embodiment of the present invention. Among the drawings, FIG. 1 are drawings illustrating a structure of the injection molding mold 2 in an injection standby state. FIG. 2 are drawings illustrating the structure of the injection molding mold 2 in the case where an external piece 3 in the injection standby state is turned eccentrically with respect to a center pin 4 clockwise by a predetermined angle (θ). FIG. 1(a) is a plan view of a second mold illustrating the injection molding mold illustrated in FIG. 1(b) taken along a line A1-A1. FIG. 1(b) is a cross-sectional view of the injection molding mold illustrated taken along a line A2-A2 in FIG. 1(a). FIG. 2(a) is a plan view of a second mold illustrating the injection molding mold illustrated in FIG. 2(b) taken along a line A3-A3. FIG. 2(b) is a cross-sectional view of the injection molding mold illustrated taken along a line A4-A4 in FIG. 2(a).

Figures 4A, 4B, 4C:
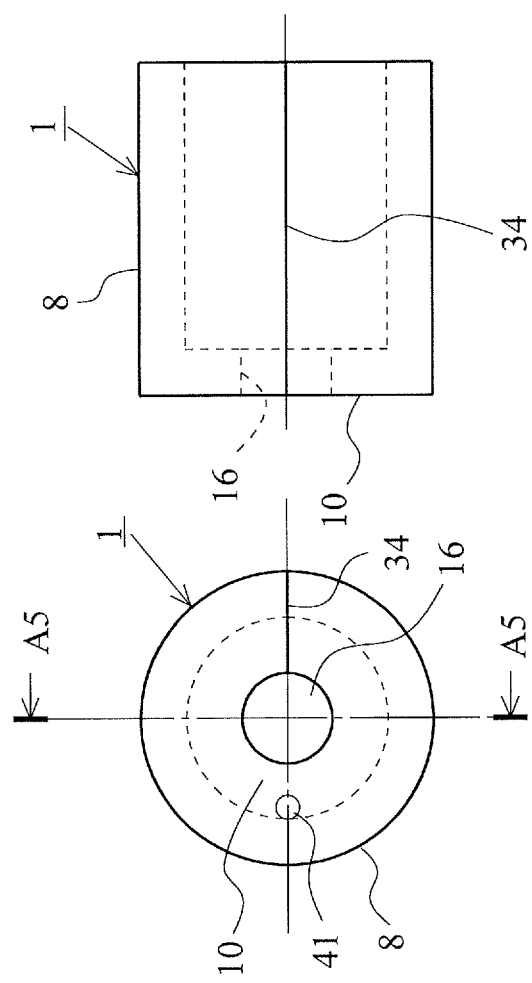
FIGS. 4A-4C are drawings illustrating a cylindrical article injection-molded with an injection molding mold according to the first embodiment of the present invention.

As illustrated in FIG. 1 and FIG. 2, the injection molding mold 2 forms a cavity 7 on a side of butt planes 5a and 6a of a first mold 5 and a second mold 6. The cavity 7 has a shape that shapes the cylindrical article 1 made of a fiber-reinforced resin material (hereinafter abbreviated as the cylindrical article 1) illustrated in FIG. 4 so as to be filled with a molten resin containing reinforcing fibers. As illustrated in FIG. 4, the cylindrical article 1 includes a cylinder portion 8 and a hollow circular plate 10 formed integrally with one end of this cylinder portion 8. The cavity 7, which shapes this cylindrical article 1, includes a first cavity portion 11 to shape the cylinder portion 8 and a second cavity portion 12. The second cavity portion 12 is positioned at one end of the first cavity portion 11 to shape the hollow circular plate 10. This cavity 7 is formed in the second mold 6 such that the first mold 5 covers an opening end of the cavity 7. As the molten resin containing the reinforcing fibers, PA66-GF30 (nylon 66 containing 30% glass fiber), PA6-GF (nylon 6 containing 20% glass fiber), PPS-GF40 (polyphenylenesulfide containing 40% glass fiber), POM-GF25 (polyacetal containing 25% glass fiber), or a similar material is used.

The first mold 5 forms a gate 13 (pinpoint gate) open to the second cavity portion 12, which is formed at the second mold 6. The second mold 6 has an approximately round-bar shaped center pin 4, which is positioned on an inner peripheral surface side of the first cavity portion 11, and the external piece 3, which is positioned on an outer peripheral surface side of the first cavity portion 11. An outer peripheral surface 14a of a large-diameter portion 14 of the center pin 4 shapes the inner peripheral surface side of the first cavity portion 11. An inner peripheral surface 3a (an inner peripheral surface of a cavity forming hole 18) of the external piece 3 shapes the outer peripheral surface side of the first cavity portion 11.

A round-bar shaped small-diameter portion 15 bumped against the butt plane 5a of the first mold 5 is formed at the distal end side of the center pin 4. This small-diameter portion 15 is formed integrally with the center on the distal end side of the center pin 4, forming a center hole 16 on the hollow circular plate 10. The second cavity portion 12 is formed by a distal end surface 17 of the large-diameter portion 14 of the center pin 4, an outer peripheral surface 15a of the small-diameter portion 15, and the butt plane 5a of the first mold 5.

The external piece 3 is a cylindrical body shaped so as to surround the center pin 4. The cavity forming hole 18, which shapes the outer peripheral surface side of the first cavity portion 11, penetrates in a direction along a central axis P0 (a direction along a Z-axis in FIG. 1(b) and FIG. 2(b)). An end surface 3b on one end side of this external piece 3 is bumped against the butt plane 5a of the first mold 5 during mold clamping and the other end side is turnably supported by an external piece support body 20. A flange-shaped flange portion 21 is formed on the other end side of the external piece 3. An annular recess 22 with a diameter larger than the cavity forming hole 18 is also formed on the other end side.

With the external piece 3, the annular recess 22 on the other end side is engaged with an eccentric turning support portion 23 of the external piece support body 20 so as to be relatively turnable. An end surface 21a of the flange portion 21 is supported to an external piece support surface 20a of the external piece support body 20 so as to be relatively turnable. Thus, the external piece 3 is turnable around a central axis P1 of the eccentric turning support portion 23. While this external piece 3 has the central axis P0 positioned coaxially with the central axis P1 of the eccentric turning support portion 23, a center 18a of the cavity forming hole 18 is eccentric with respect to the central axis P0 by a predetermined dimension (e) (see FIG. 3). At the flange portion 21 of the external piece 3, a cutout groove 26 engaged with a driving protrusion 25 of rotational driving means 24 is formed. Such external piece 3 is turned around the central axis P1 of the eccentric turning support portion 23 by a predetermined angle (θ) by the rotational driving means 24 (see FIG. 1(a) and FIG. 2(a)). Accordingly, the external piece 3 is turned while being eccentric with respect to a central axis P2 of the center pin 4. An outer peripheral surface 3c of the external piece 3 is housed in an external piece housing hole 27 formed at the second mold 6. The flange portion 21 is housed in a flange portion housing concave portion 28 formed at the second mold 6. The external piece housing hole 27 and the flange portion housing concave portion 28 at the second mold 6 are formed with the central axis P2 of the center pin 4 as the center and are formed so as not to be in contact with the outer peripheral surface 3c of the external piece 3, which is turned by the rotational driving means 24, and an outer peripheral surface 21b of the flange portion 21 of the external piece 3.

The external piece support body 20 has the external piece support surface 20a at the distal end side (the end portion side close to the external piece 3). The annular eccentric turning support portion 23 of the external piece support body 20 is formed projecting from the external piece support surface 20a along the Z-axis direction. The external piece support surface 20a positions the external piece 3 in the Z-axis direction. The eccentric turning support portion 23 is fitted to an inner peripheral surface of the annular recess 22 of the external piece 3 via a slight clearance and positions the external piece 3 on an X-Y plane. With the external piece support body 20, the central axis P1 of the eccentric turning support portion 23 is eccentric with respect to the central axis P2 of the center pin 4 by the predetermined dimension (e). The central axis P1 of this eccentric turning support portion 23 is formed so as to be positioned coaxially with the central axis P0 of the external piece 3. The external piece support body 20 houses a cylindrical-shaped ejector sleeve 30, which slidingly moves along the center pin 4. After the molten resin containing the reinforcing fibers in the cavity 7 cools and hardens to form the cylindrical article 1 and the first mold 5 and the second mold 6 are separated, this ejector sleeve 30 extrudes the cylindrical article 1 from the inside of the cavity 7.

Figure 3:
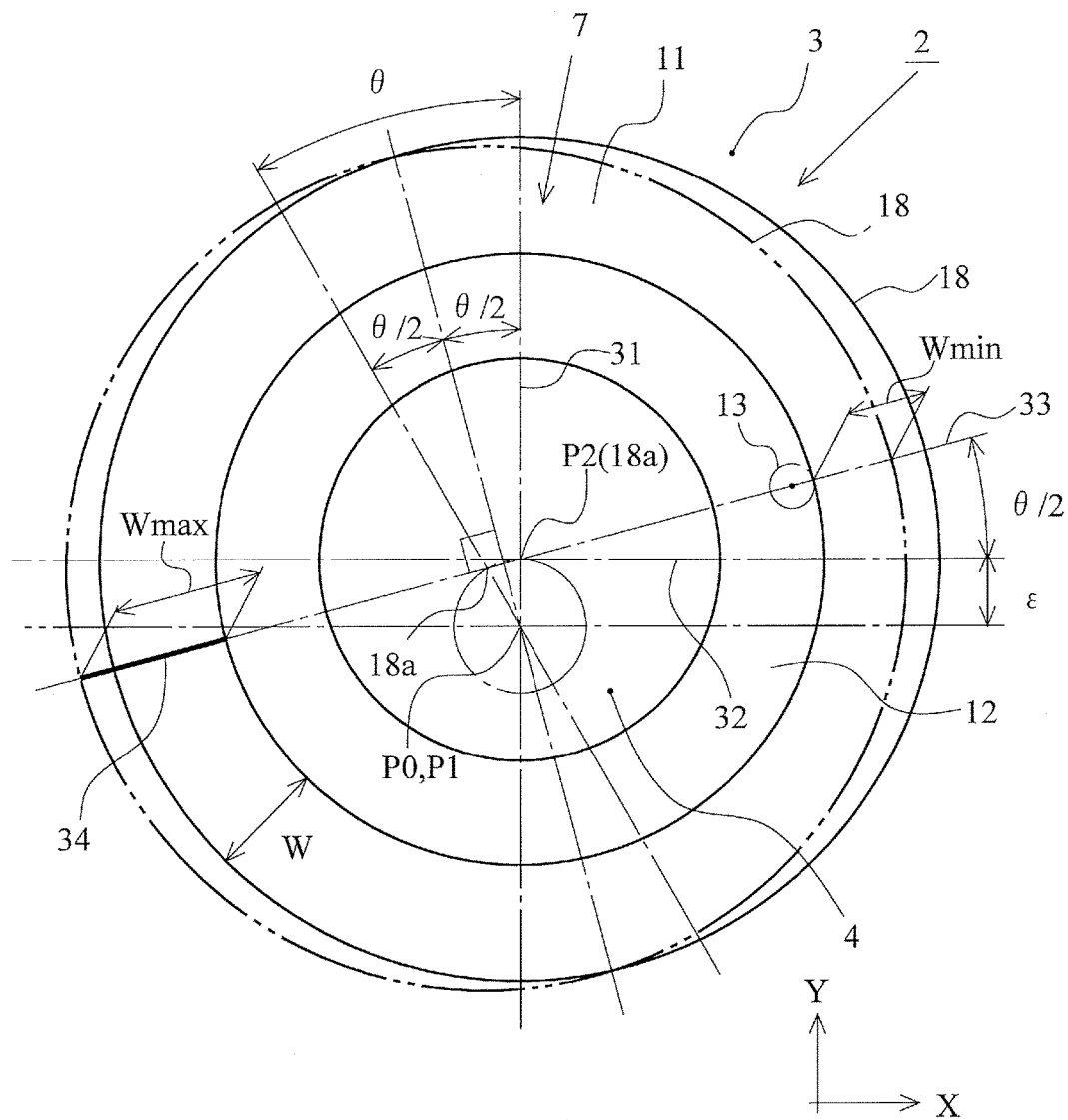
FIG. 3 is a drawing schematically illustrating a relationship between the center pin and the external piece.

FIG. 3 is a drawing schematically illustrating the relationship between the center pin 4 and the external piece 3. In FIG. 3, in the case where the central axis P2 of the center pin 4 is concentric with the center 18a of the cavity forming hole 18 of the external piece 3, the cavity 7 has a cavity width (W) with uniform dimension along the circumferential direction of the center pin 4 and corresponds to the cavity 7 illustrated in FIG. 2(a). FIG. 3 illustrates the cavity forming hole 18 in this case by the solid line.

The central axis P1 of the eccentric turning support portion 23 is disposed on a center line (a reference center line) 31 intersecting with the central axis P2 of the center pin 4 and extending parallel to the Y-axis. This central axis P1 of the eccentric turning support portion 23 is positioned (eccentric) away from the central axis P2 of the center pin 4 along the reference center line 31 by the predetermined dimension (e). When the external piece 3 is turned around the central axis P1 of the eccentric turning support portion 23 anticlockwise by the predetermined angle (θ), the center 18a of the cavity forming hole 18 is displaced from the center of the center pin 4 (the central axis P2) and is disposed at a position in the injection standby state (disposed as illustrated in FIG. 1 (a)). FIG. 3 illustrates the cavity forming hole 18 in this case by the two-dot chain line. The center 18a of the cavity forming hole 18 is at a position displaced most from the central axis P2 of the center pin 4. Consequently, an interval between the outer peripheral surface of the center pin 4 along the radial direction of the center pin 4 and the inner peripheral surface of the cavity forming hole 18 (abbreviated as a cavity width (W)) becomes uneven along the circumferential direction of the center pin 4. The cavity width (W) becomes the maximum value (Wmax) and the minimum value (Wmin) on a center line 33, which is a line of rotating a center line 32, which passes through the center of the center pin 4 (intersects with the central axis P2) and is parallel to the X-axis, around the central axis P2 anticlockwise by (θ/2). Moreover, the cavity 7 has a line-symmetrical shape with the center line 33 as the symmetrical axis. Therefore, with the injection molding mold 2 according to the embodiment, the gate 13 is disposed at the position on the center line 33 and the side where the cavity width (W) becomes the minimum value (Wmin). Thus, the injection molding mold 2 is configured such that the molten resin containing the fiber reinforcing injected from this gate 13 into the cavity 7 shapes a weld line 34 at the position on the center line 33 rotated by 180° from the gate 13 (the position where the cavity width (W) becomes the maximum value (Wmax)). The injection molding mold 2 illustrated in FIG. 3 is turned around the central axis P2 of the center pin 4 by (90°+(θ/2)) clockwise. Thus, the injection molding mold 2 according to the embodiment is disposed as illustrated in FIG. 1 (a). With the injection molding mold 2 according to the embodiment, optimal values are determined for the predetermined dimension (e) and the predetermined angle (θ) according to the size of the cavity 7, a kind of a resin material containing reinforcing fibers, and a similar specification.

The rotational driving means 24, which turns the external piece 3 by the predetermined angle (θ), includes a slider 36 and an actuator 37 (such as a hydraulic cylinder and a pneumatic cylinder) that reciprocates this slider 36. The slider 36 is housed in a slider guide hole 35 formed at the second mold 6 to be slidably movable. The slider 36 has the driving protrusion 25 engaged with the cutout groove 26 of the flange portion 21 of the external piece 3. The driving protrusion 25 is hooked to the groove wall of the cutout groove 26 of the external piece 3, and the slider 36 slidably moves the inside of the slider guide hole 35. Thus, the external piece 3 is turned around the central axis P1 of the eccentric turning support portion 23 by the predetermined angle (θ). The slider guide hole 35 communicates with the inside of the flange portion housing concave portion 28 via a window 38, which ensures the movement of the driving protrusion 25. The slider 36 is fixed to a rod 40 extending from the actuator 37 and moves integrally with the rod 40. The slider 36 and the slider guide hole 35 have a quadrilateral cross-sectional shape taken along an imaginary plane parallel to the Y-Z coordinate plane so as to ensure receiving a force acting on the slider 36 by the surface.

With the injection molding mold 2 as described above, the molten resin containing the reinforcing fibers is injected from the gate 13 into the cavity 7 in the injection standby state as illustrated in FIG. 1 and FIG. 3 where the center 18a of the cavity forming hole 18 on the external piece 3 is displaced with respect to the central axis P2 of the center pin 4 and the positions of the maximum value (Wmax) and the minimum value (Wmin) of the cavity width (W) are on the straight line (the center line 33) connecting the center of the center pin 4 and the center of the gate 13, and the first mold 5 and the second mold 6 are bumped against one another and clamped. Then, the molten resin containing the reinforcing fibers injected into the cavity 7 equally flows from a part (a part of the cavity 7) with the minimum value (Wmin) of the cavity width (W) to the part with the maximum value (Wmax) of the cavity width (W) inside the cavity 7. The molten resins containing the reinforcing fibers join together at the part with the maximum value (Wmax) of the cavity width (W), and the weld line 34 is formed at the joining portion (see FIG. 4). Then, with the injection molding mold 2, when the molten resin containing the reinforcing fibers is filled in the whole region in the cavity 7 and before the molten resin containing the reinforcing fibers cools and loses fluidity, the rotational driving means 24 is operated and the external piece 3 is turned around the central axis P1 of the eccentric turning support portion 23 clockwise by the predetermined angle (θ) by the rotational driving means 24 (see FIG. 2). Accordingly, with the injection molding mold 2, the central axis P2 of the center pin 4 matches the center 18a of the cavity forming hole 18 on the external piece 3. This makes the cavity width (W) of the cavity 7 constant along the circumferential direction of the center pin 4. Thus, when the injection molding mold 2 changes the state illustrated in FIG. 1 to the state illustrated in FIG. 2, an interval between the inner peripheral surface 3a of the external piece 3 and the outer peripheral surface 14a of the large-diameter portion 14 of the center pin 4 changes. The cavity width (W) of the cavity 7 varies, and the molten resin containing the reinforcing fibers in the cavity 7 is forcibly caused to flow into the cavity 7. The orientations of the reinforcing fibers of the molten resin containing the reinforcing fibers in the cavity 7 are disturbed, thus the reinforcing fibers at the weld line 34 and around the weld line 34 tangle (see FIG. 4). Especially, with the injection molding mold 2 according to the embodiment, the cavity width (W) at the part where the weld line 34 is formed is formed to have the maximum value (Wmax) in the cavity 7. Additionally, the cavity width (W) on the side of the part where the gate 13 opens is formed to have the minimum value (Wmin) in the cavity 7. Therefore, when the state changes from the state illustrated in FIG. 1 to the state illustrated in FIG. 2, changes (ΔW) in the cavity width (W) at the part where the weld line 34 is formed and on the side of the part where the gate 13 opens become the largest (ΔW=(Wmax+Wmin)/2−Wmax or ΔW=(Wmax+Wmin)/2−Wmin) in the cavity 7. Consequently, with the injection molding mold 2 according to the embodiment, the molten resins containing the reinforcing fibers at the part where the weld line 34 is formed and on the side of the part where the gate 13 opens in the cavity 7 and the gate 13 opens flow more than the other parts in the cavity 7, thereby ensuring effectively disturbing the orientations of the reinforcing fibers at the weld line 34 and near the weld line 34.

Afterwards, when the molten resin containing the reinforcing fibers in the cavity 7 cools and hardens and the cylindrical article 1 is shaped, the first mold 5 and the second mold 6 of the injection molding mold 2 are separated (the molds are opened). The ejector sleeve 30 extrudes the cylindrical article 1 in the cavity 7 to the outside of the cavity 7. Thus, the injection-molded cylindrical article 1 is taken out from the inside of the cavity 7 of the injection molding mold 2.

With the injection molding mold 2, after the cylindrical article 1 is taken out from the inside of the cavity 7, the turning driving means 24 is operated to turn and return the external piece 3 from the position illustrated in FIG. 2 to the injection standby position illustrated in FIG. 1 to prepare for the next injection molding.

With the injection molding mold 2 according to the above-described embodiment, the directions of the reinforcing fibers at the weld line 34 and near the weld line 34 in the injection-molded cylindrical article 1 are disturbed. The reinforcing fibers at the weld line 34 and near the weld line 34 in the cylindrical article 1 tangle. Accordingly, the weld line 34 in the cylindrical article 1 is less likely to be noticeable, and the strength at the part where the weld line 34 is formed in the cylindrical article 1 is improved.

(Injection Molding Method of Cylindrical Article)

The following describes the injection molding method of the cylindrical article 1 using the injection molding mold 2 according to the embodiment.

The injection molding method of the cylindrical article 1 according to the embodiment includes first to fourth steps described below in detail.

First, the first step of the injection molding injects the molten resin containing the reinforcing fibers from the gate 13 into the cavity 7 in the injection standby state as illustrated in FIG. 1 and FIG. 3 where the center 18a of the cavity forming hole 18 on the external piece 3 is displaced with respect to the central axis P2 of the center pin 4 and the positions of the maximum value (Wmax) and the minimum value (Wmin) of the cavity width (W) are on the straight line (the center line 33) connecting the central axis P2 of the center pin 4 and the center of the gate 13, and the first mold 5 and the second mold 6 are bumped against one another and clamped. In this respect, the molten resins containing the reinforcing fibers injected from the gate 13 at the position with the cavity width (W) being the minimum value (Wmin) into the cavity 7 join together at the position of circumferentially rotated from the gate 13 by 180° (the position with the cavity width (W) being the maximum value (Wmax)), and the weld line 34 is formed at the part where the molten resins containing the reinforcing fibers join together (see FIG. 4).

Next, the second step of the injection molding turns the external piece 3 around the central axis P1 of the eccentric turning support portion 23 clockwise by the predetermined angle (θ) by the rotational driving means 24 when the molten resin containing the reinforcing fibers is filled in the whole region in the cavity 7 and before the molten resin containing the reinforcing fibers filled in the cavity 7 cools and loses the fluidity to match the central axis P2 of the center pin 4 with the center 18a of the cavity forming hole 18 on the external piece 3. This makes the cavity width (W) of the cavity 7 constant along the circumferential direction of the center pin 4 (see FIG. 2). The second step of the injection molding changes the interval between the inner peripheral surface 3a of the external piece 3 and the external surface 14a of the large-diameter portion 14 of the center pin 4. This varies the cavity width (W) of the cavity 7 and forcibly causes the molten resin containing the reinforcing fibers in the cavity 7 to flow into the cavity 7. The orientations of the reinforcing fibers of the molten resins containing the reinforcing fibers in the cavity 7 are disturbed, thus the reinforcing fibers at the weld line 34 and around the weld line 34 tangle (see FIG. 4).

Next, after the molten resin containing the reinforcing fibers in the cavity 7 cools and hardens, the third step of the injection molding separates the first mold 5 and the second mold 6. Accordingly, the cylindrical article (the injection molded product) 1 in the cavity 7 on the second mold 6 side and the gate 13 on the first mold 5 side are separated. A separation mark 41 of the gate 13 is formed on an external surface of the hollow circular plate 10 of the cylindrical article 1.

Next, the fourth step of the injection molding extrudes the cylindrical article 1 in the cavity 7 to the outside of the cavity 7 by the ejector sleeve 30 to take out the injection-molded cylindrical article 1 from the inside of the cavity 7.

With the injection molding method according to the above-described embodiment, the directions of the reinforcing fibers at the weld line 34 and near the weld line 34 in the injection-molded cylindrical article 1 are disturbed. The reinforcing fibers at the weld line 34 and near the weld line 34 in the cylindrical article 1 tangle. Accordingly, the weld line 34 in the cylindrical article 1 is less likely to be noticeable, and the strength at the part where the weld line 34 is formed in the cylindrical article 1 is improved.

(Cylindrical Article)

The cylindrical article 1 according to the embodiment illustrated in FIG. 4 is formed using the above-described injection molding mold 2 and the above-described injection molding method. This cylindrical article 1 includes the cylinder portion 8 and the hollow circular plate 10 formed integrally with one end of this cylinder portion 8. The separation mark 41 of the gate 13 is formed on the hollow circular plate 10 at the one end of the cylindrical article 1. The reinforcing fibers 25 at the weld line 34 and near the weld line 34 complexly tangle in the cylindrical article 1.

In the cylindrical article 1 according to the embodiment, the directions of the reinforcing fibers at the weld line 34 and near the weld line 34 are disturbed, and the reinforcing fibers at the weld line 34 and near the weld line 34 tangle. Therefore, the weld line 34 is less likely to be noticeable, improving the strength at the part where the weld line 34 is formed.

Second Embodiment (Injection Molding Mold for Cylindrical Article)

Figure 5A:
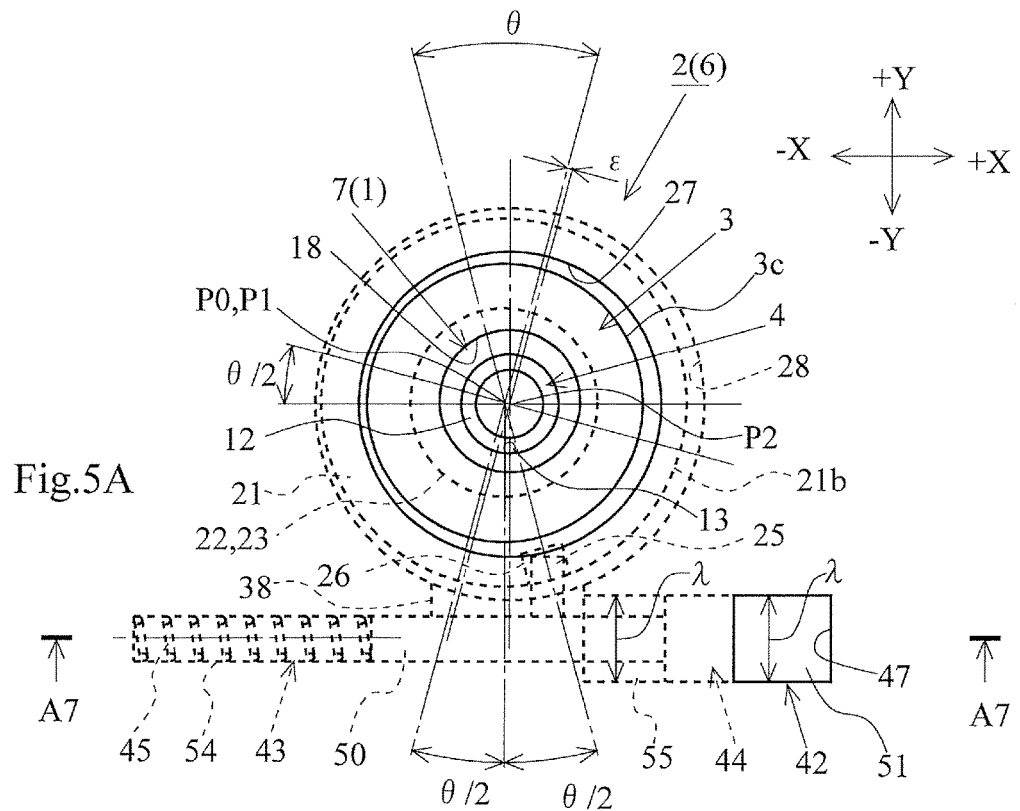
FIGS. 5A and 5B are drawings illustrating a structure of an injection molding mold according to a second embodiment of the present invention and are drawings illustrating a modification of rotational driving means of the injection molding mold illustrated in FIG. 1.
Figure 5B:
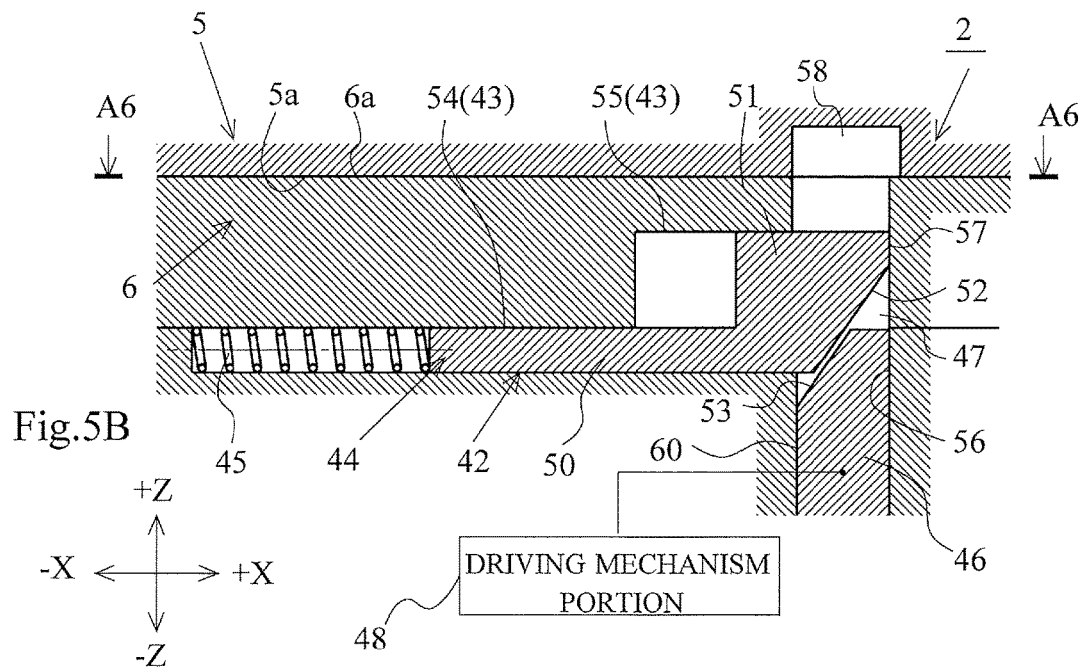
Figure 6A:
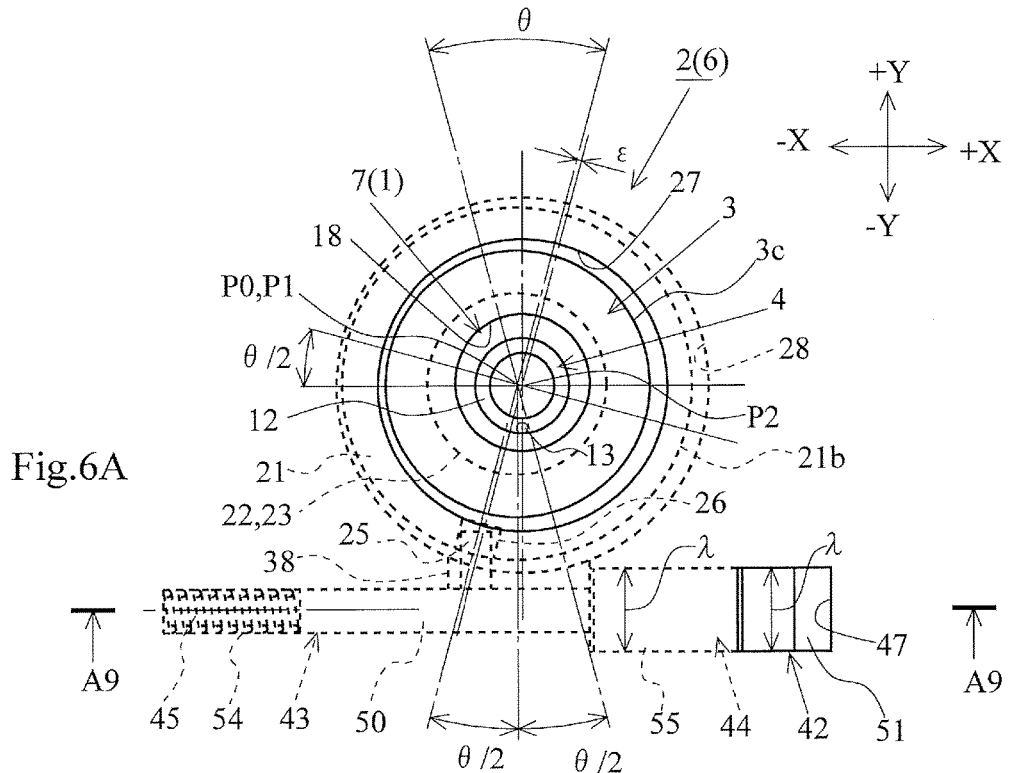
FIGS. 6A and 6B are drawings illustrating the structure of the injection molding mold according to the second embodiment of the present invention and are drawings illustrating the structure of the injection molding mold in the case where the external piece in the injection standby state in FIG. 5 is turned eccentrically with respect to the center pin clockwise by the predetermined angle.
Figure 6B:
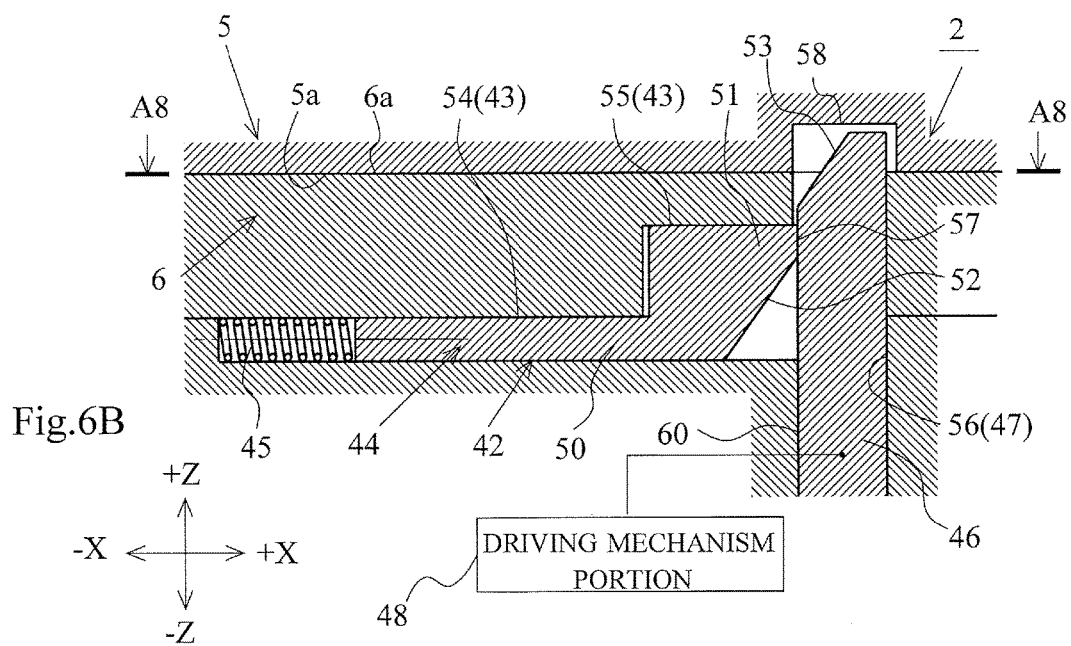

FIG. 5 and FIG. 6 are drawings illustrating the injection molding mold 2 according to the second embodiment of the present invention, and in particular are drawings illustrating a modification of the rotational driving means 24 of the injection molding mold 2 according to the first embodiment. Among the drawings, FIGS. 5A and 5B are drawings illustrating the structure of the injection molding mold 2 in the injection standby state. FIGS. 6A and 6B are drawings illustrating the structure of the injection molding mold 2 in the case where the external piece 3 in the injection standby state is turned eccentrically with respect to the center pin 4 clockwise by the predetermined angle (θ). FIG. 5A is a plan view of the second mold illustrating the injection molding mold illustrated in FIG. 5B taken along a line A6-A6. FIG. 5B is a cross-sectional view of the injection molding mold illustrated taken along a line A7-A7 in FIG. 5A. FIG. 6A is a plan view of the second mold illustrating the injection molding mold illustrated in FIG. 6B taken along a line A8-A8. FIG. 6B is a cross-sectional view of the injection molding mold illustrated taken along a line A9-A9 in FIG. 6A.

The injection molding mold 2 according to the embodiment illustrated in FIG. 5 and FIG. 6 has a configuration similar to the injection molding mold 2 according to the first embodiment other than rotational driving means 42. Therefore, the following omits the explanation overlapping with the explanation of the injection molding mold 2 according to the first embodiment, but describes the component (the rotational driving means) different from the injection molding mold 2 according to the first embodiment in detail.

The rotational driving means 42 of the injection molding mold 2 according to the embodiment includes a slider 44, a spring 45 (a compression coil spring), an operation pin 46, and a driving mechanism portion 48. The slider 44 is housed in a slider guide hole 43 formed at the second mold 6 to be slidably movable. The spring 45 always urges this slider 44 in one direction. The operation pin 46 slidably moves the slider 44 urged by this spring 45. The driving mechanism portion 48 slidably moves this operation pin 46 along an operation pin guide hole 47.

The slider 44 includes a rod portion 50 and a head portion 51. The rod portion 50 has a quadrilateral cross-sectional shape taken along an imaginary plane parallel to a Y-Z coordinate plane. The head portion 51 is formed integrally with the distal end of this rod portion 50. The rod portion 50 has the driving protrusion 25 engaged with the cutout groove 26 of the flange portion 21 of the external piece 3. The driving protrusion 25 is hooked to the groove wall of the cutout groove 26 of the external piece 3, and the slider 44 slidably moves the inside of the slider guide hole 43. Thus, the external piece 3 is turned around the central axis P1 of the eccentric turning support portion 23 by the predetermined angle (θ). The driving protrusion 25 can move the inside of the window 38, which communicates between the inside of the slider guide hole 43 and the inside of the flange portion housing concave portion 28. The head portion 51 is formed projecting out from the rod portion 50 along the +Y-axis direction and the −Y-axis direction by the identical dimension and is formed also projecting out from the rod portion 50 along the +Z-axis direction. The head portion 51 has the quadrilateral cross-sectional shape taken along the imaginary plane parallel to the Y-Z coordinate plane. As illustrated in FIG. 5B, the head portion 51 has an inclined surface 52 inclined from the distal end (the distal end along the +X-axis direction) to obliquely downward to the left. Pressing this inclined surface 52 by the operation pin 46 generates an inclined surface component force against an urging force from the spring 45.

The operation pin 46 is coupled to the driving mechanism portion 48 having a cross-sectional shape taken along the imaginary plane parallel to the X-Y coordinate plane of quadrilateral, bar-shaped body driven by a driving device (not illustrated) of the ejector sleeve 30. This operation pin 46 slidably moves the inside of the operation pin guide hole 47 extending along the Z-axis direction by the driving mechanism portion 48. As illustrated in FIG. 5B, this operation pin 46 has an inclined surface 53 inclined from the distal end (the upper end) to obliquely downward to the left. This inclined surface 53 contacts the inclined surface 52 of the slider 44 by the surface to slidably move the slider 44. This operation pin 46 has a width dimension (k) identical to the width dimension (k) of the head portion 51 of the slider 44 (see FIG. 5A). This operation pin 46 is slidably moved separately from the ejector sleeve 30 by the driving mechanism portion 48.

The slider guide hole 43 is formed along the X-axis direction and includes a rod portion guide hole 54 and a head portion guide hole 55. The rod portion guide hole 54 guides the slidable movement of the rod portion 50 of the slider 44. The head portion guide hole 55 guides the slidable movement of the head portion 51 of the slider 44. The head portion guide hole 55 of the slider guide hole 43 opens to the operation pin guide hole 47. The rod portion guide hole 54 of this slider guide hole 43 has the cross-sectional shape taken along the imaginary plane parallel to the Y-Z coordinate plane similar to the cross-sectional shape of the rod portion 50 of the slider 44, which is the quadrilateral shape. The rod portion guide hole 54 contacts the rod portion 50 of the slider 44 by the surface to slidably move the slider 44 along the X-axis direction without changing the posture of the slider 44. The head portion guide hole 55 of the slider guide hole 43 has the cross-sectional shape taken along the imaginary plane parallel to the Y-Z coordinate plane similar to the cross-sectional shape of the head portion 51 of the slider 44, which is the quadrilateral shape. The head portion guide hole 55 contacts the head portion 51 of the slider 44 by the surface to slidably move the slider 44 along the X-axis direction without changing the posture of the slider 44. Consequently, with the slider guide hole 43, the driving protrusion 25 of the slider 44 is precisely engaged with the cutout groove 26 at the flange portion 21 of the external piece 3. Additionally, the inclined surface 52 at the distal end of the slider 44 is precisely contacted with the inclined surface 53 of the operation pin 46 by the surface. Thus, the external piece 3 can be precisely turned by the predetermined angle (θ).

The operation pin guide hole 47 is formed along the Z-axis direction and squarely intersects with the slider guide hole 43. This operation pin guide hole 47 has a quadrilateral cross-sectional shape taken along the imaginary plane parallel to the X-Y coordinate plane similar to the cross-sectional shape of the operation pin 46. The head portion 51 of the slider 44 can enter the operation pin guide hole 47 (see FIG. 5). A distal end surface 57 of the head portion 51 of the slider 44 urged by the spring 45 is bumped against a wall surface 56 of the operation pin guide hole 47 opposed to the slider guide hole 43. Thus, the wall surface 56 functions as a positioning surface of the slider 44 in the injection standby state (see FIG. 5). The operation pin guide hole 47 can house the operation pin 46 at a position so as not to contact the slider 44 in the injection standby state. The operation pin guide hole 47 contacts the operation pin 46 by the surface to slidably move the operation pin 46 along the Z-axis direction without changing the posture of the operation pin 46. Consequently, the operation pin guide hole 47 precisely brings the inclined surface 53 of the operation pin 46 into contact with the inclined surface 52 of the head portion 51 of the slider 44 by the surface, thereby allowing the external piece 3 to be precisely turned by the predetermined angle (θ).

An operation pin release hole 58 with a bottom is formed at a position opposed to the operation pin guide hole 47 in the mold mating surface 5a of the first mold 5. The operation pin release hole 58 allows the distal end side of the operation pin 46 to project from the mold mating surface 6a of the second mold 6. Consequently, the distal end of the operation pin 46, which slidably moves the inside of the operation pin guide hole 47, is entered to the operation pin release hole 58 with the first mold 5 mold clamped with the second mold 6 to push the slider 44 into the slider guide hole 43 against the urging force by the spring 45. The distal end of the head portion 51 of the slider 44 can be positioned at a side surface 60 opposed to the slider 44. Accordingly, the operation pin 46 can position the slider 44 at the position of rotating the external piece 3 from the position in the injection standby state clockwise by the predetermined angle (θ) and can stop the slider 44 urged by the spring 45.

With the injection molding mold 2 according to the above-described embodiment, the external piece 3 is turned by the rotational driving means 42 similar to the injection molding mold 2 according to the first embodiment. That is, with the injection molding mold 2 according to the embodiment, the molten resin containing the reinforcing fibers is injected from the gate 13 into the cavity 7 in the injection standby state as illustrated in FIG. 3 and FIG. 5 where the center 18a of the cavity forming hole 18 on the external piece 3 is displaced with respect to the central axis P2 of the center pin 4 and the positions of the maximum value (Wmax) and the minimum value (Wmin) of the cavity width (W) are on the straight line (the center line 33) connecting the central axis P2 of the center pin 4 and the center of the gate 13, and the first mold 5 and the second mold 6 are bumped against one another and clamped. Then, the molten resin containing the reinforcing fibers injected into the cavity 7 equally flows from a part with the minimum value (Wmin) of the cavity width (W) to the part with the maximum value (Wmax) of the cavity width (W). The molten resins containing the reinforcing fibers join together at the part with the maximum value (Wmax) of the cavity width (W) and the weld line 34 is formed at the joining portion (see FIG. 4). Then, with the injection molding mold 2, when the molten resin containing the reinforcing fibers is filled in the whole region in the cavity 7 and before the molten resin containing the reinforcing fibers cools and loses fluidity, the rotational driving means 42 is operated and the external piece 3 is turned around the central axis P1 of the eccentric turning support portion 23 clockwise by the predetermined angle (θ) by the rotational driving means 42 (see FIG. 6). Accordingly, with the injection molding mold 2, the central axis P2 of the center pin 4 matches the center 18a of the cavity forming hole 18 on the external piece 3. This makes the cavity width (W) of the cavity 7 constant along the circumferential direction of the center pin 4. Thus, when the injection molding mold 2 changes the state illustrated in FIG. 5 to the state illustrated in FIG. 6, the inner peripheral surface 3a of the external piece 3 and the external surface 14a of the large-diameter portion 14 of the center pin 4 change. The cavity width (W) of the cavity 7 varies, and the molten resin containing the reinforcing fibers in the cavity 7 is forcibly caused to flow into the cavity 7. The orientations of the reinforcing fibers of the molten resin containing the reinforcing fibers in the cavity 7 are disturbed, thus the reinforcing fibers at the weld line 34 and around the weld line 34 tangle (see FIG. 4).

As described above, the injection molding mold 2 according to the embodiment operates similarly to the injection molding mold 2 according to the first embodiment and can obtain the effects similar to the injection molding mold 2 according to the first embodiment.

Since the injection molding method using the injection molding mold 2 according to the embodiment includes the first step to the fourth step similar to the injection molding method according to the first embodiment, the injection molding method can obtain the effects similar to the injection molding method according to the first embodiment.

In the cylindrical article 1 injection-molded using the injection molding mold 2 according to the embodiment, similar to the cylindrical article 1 injection-molded using the injection molding mold 2 according to the first embodiment, the directions of the reinforcing fibers at the weld line 34 and near the weld line 34 are disturbed, and the reinforcing fibers at the weld line 34 and near the weld line 34 tangle. Therefore, the weld line 34 is less likely to be noticeable, improving the strength at the part where the weld line 34 is formed.

Third Embodiment

FIG. 7 and FIG. 8 are drawings illustrating the injection molding mold 2 for the cylindrical article 1 according to the third embodiment of the present invention. Among the drawings, FIGS. 7A and 7B are drawings illustrating a modification of the injection molding mold 2 according to the first embodiment and are drawings illustrating the structure of the injection molding mold 2 in the injection standby state. FIGS. 8A an 8B are drawings illustrating the structure of the injection molding mold 2 in the case where the external piece 3 in the injection standby state is turned eccentrically with respect to the center pin 4 clockwise by the predetermined angle (θ). FIG. 7A is a plan view of the second mold illustrating the injection molding mold illustrated in FIG. 7B taken along a line A10-A10. FIG. 7B is a cross-sectional view of the injection molding mold illustrated taken along a line A11-A11 in FIG. 7A. FIG. 8A is a plan view of the second mold illustrating the injection molding mold illustrated in FIG. 8B taken along a line A12-A12. FIG. 8B is a cross-sectional view of the injection molding mold illustrated taken along a line A13-A13 in FIG. 8A.

The injection molding mold 2 according to this embodiment differs from the injection molding mold 2 according to the first embodiment in a shape of the cavity 7 and a position of the gate 13. However, since the other basic configurations are similar to those of the injection molding mold 2 according to the first embodiment, reference numerals identical to those of the injection molding mold 2 according to the first embodiment are assigned to the components corresponding to the injection molding mold 2 according to the first embodiment, and therefore the following omits the explanation overlapping with the explanation of the first embodiment.

As illustrated in FIG. 7 and FIG. 8, with the injection molding mold 2, the cylindrical article 1 produced through the injection molding has the cylindrical shape and does not include the hollow circular plate 10 (see FIG. 4 and FIG. 9). Therefore, the injection molding mold 2 does not include the second cavity portion 12 of the injection molding mold 2 according to the first embodiment. The cavity 7 is constituted of only a part corresponding to the first cavity portion 11 of the injection molding mold 2 according to the first embodiment. Additionally, the center pin 4 differs from the center pin of the injection molding mold 2 according to the first embodiment in that the center pin 4 is formed at the identical outer diameter dimension (formed of only the large-diameter portion 14), the distal end surface 17 is bumped against the butt plane 5a of the first mold 5, and the round-bar shaped small-diameter portion 15 is omitted. The gate 13 is formed at the first mold 5 so as to open on the one end side of the cavity 7. Similar to the injection molding mold 2 according to the first embodiment, the injection molding mold 2 according to the embodiment is configured such that the gate 13 is at the position with the minimum value (Wmin) of the cavity width (W) in the injection standby state and the molten resins containing the reinforcing fibers injected from the gate 13 into the cavity 7 join together at the position with the maximum value (Wmax) of the cavity width (W) in the cavity 7 (see FIG. 3).

With the injection molding mold 2 according to the embodiment, similar to the injection molding mold 2 according to the first embodiment, the first mold 5 and the second mold 6 are bumped against one another and clamped (see FIG. 7B) while the center 18a of the cavity forming hole 18 on the external piece 3 is displaced with respect to the central axis P2 of the center pin 4 (see FIG. 7A and FIG. 3), and the molten resin containing the reinforcing fibers is injected from the gate 13 into the cavity 7. In this respect, the weld line 34 is formed at the joining portion of the molten resins containing the reinforcing fibers in the cavity 7. Then, with the injection molding mold 2, when the molten resin containing the reinforcing fibers is filled in the whole region in the cavity 7 and before the molten resin containing the reinforcing fibers cools and loses the fluidity, the rotational driving means 24 is operated and the external piece 3 is turned around the central axis P1 of the eccentric turning support portion 23 clockwise by the predetermined angle (θ) by the rotational driving means 24. This matches the center 18a of the cavity forming hole 18 on the external piece 3 with the central axis P2 of the center pin 4 (see FIG. 8). Accordingly, the interval between the inner peripheral surface 3a of the external piece 3 and the outer peripheral surface 14a of the center pin 4 changes in the injection molding mold 2. The molten resin containing the reinforcing fibers in the cavity 7 is forcibly caused to flow into the cavity 7. Consequently, the orientations of the reinforcing fibers of the molten resin containing the reinforcing fibers in the cavity 7 are disturbed, thus the reinforcing fibers at the weld line 34 and around the weld line 34 tangle.

With the injection molding mold 2 according to the above-described embodiment, the directions of the reinforcing fibers at the weld line 34 and near the weld line 34 in the injection-molded cylindrical article 1 are disturbed. The reinforcing fibers at the weld line 34 and near the weld line 34 in the cylindrical article 1 tangle. Accordingly, the weld line 34 in the cylindrical article 1 is less likely to be noticeable, and the strength at the part where the weld line 34 is formed in the cylindrical article 1 is improved.

Although the injection molding mold 2 used for the injection molding method according to the embodiment slightly differs from the injection molding mold 2 according to the first embodiment, the injection molding method is similar to the method according to the first embodiment. Accordingly, the injection molding method according to the embodiment can obtain the effects similar to the injection molding method according to the first embodiment.

FIGS. 9A-9C are drawings illustrating the cylindrical article 1 produced through the injection molding with the injection molding mold 2 according to the embodiment. FIG. 9A is a front view of the cylindrical article 1. FIG. 9B is a side view of the cylindrical article 1. FIG. 9C is a cross-sectional view of the cylindrical article 1 illustrated taken along a line A14-A14 in FIG. 9A.

As illustrated in FIG. 9, the separation mark 41 of the gate 13 is formed on an end surface 61 on the one end side of the cylindrical article 1. In the cylindrical article 1, the reinforcing fibers at the weld line 34 and near the weld line 34 complexly tangle.

In the cylindrical article 1 according to the embodiment, similar to the cylindrical article 1 according to the first embodiment, the directions of the reinforcing fibers at the weld line 34 and near the weld line 34 are disturbed, and the reinforcing fibers at the weld line 34 and near the weld line 34 tangle. Therefore, the weld line 34 is less likely to be noticeable, improving the strength at the part where the weld line 34 is formed.

Fourth Embodiment

Figure 10A:
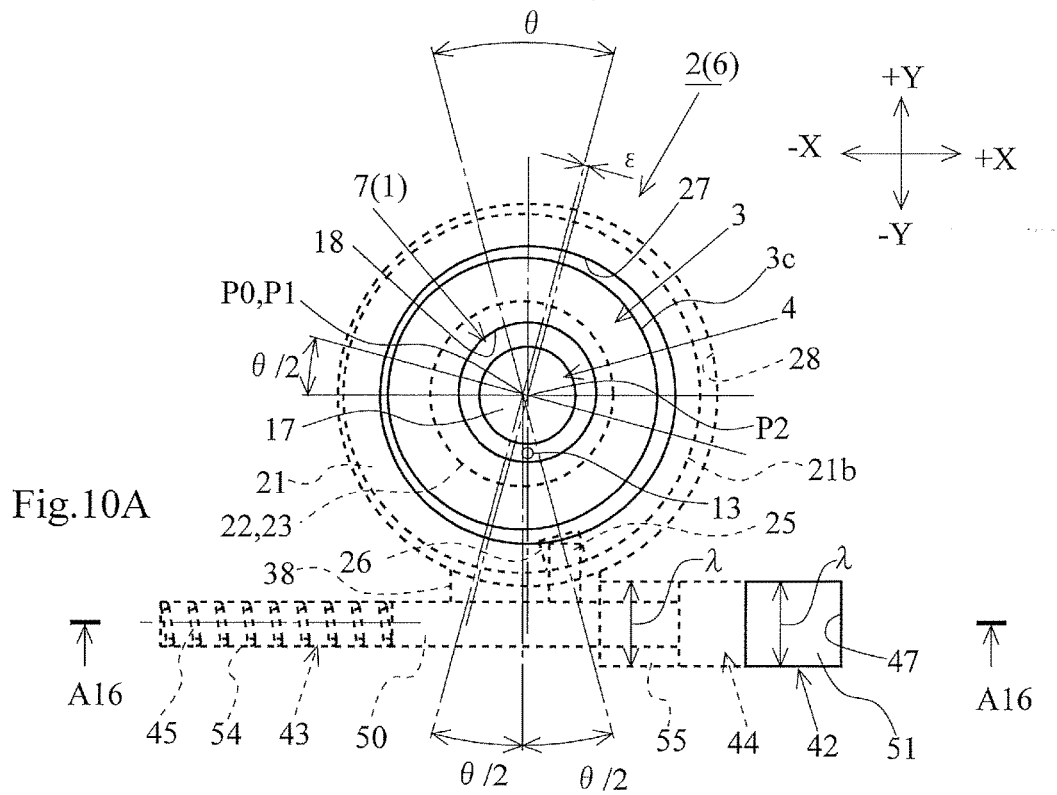
FIGS. 10A and 10B are drawings illustrating a structure of an injection molding mold according to a fourth embodiment of the present invention and are drawings illustrating a modification of the rotational driving means of the injection molding mold illustrated in FIG. 7.
Figure 10B:
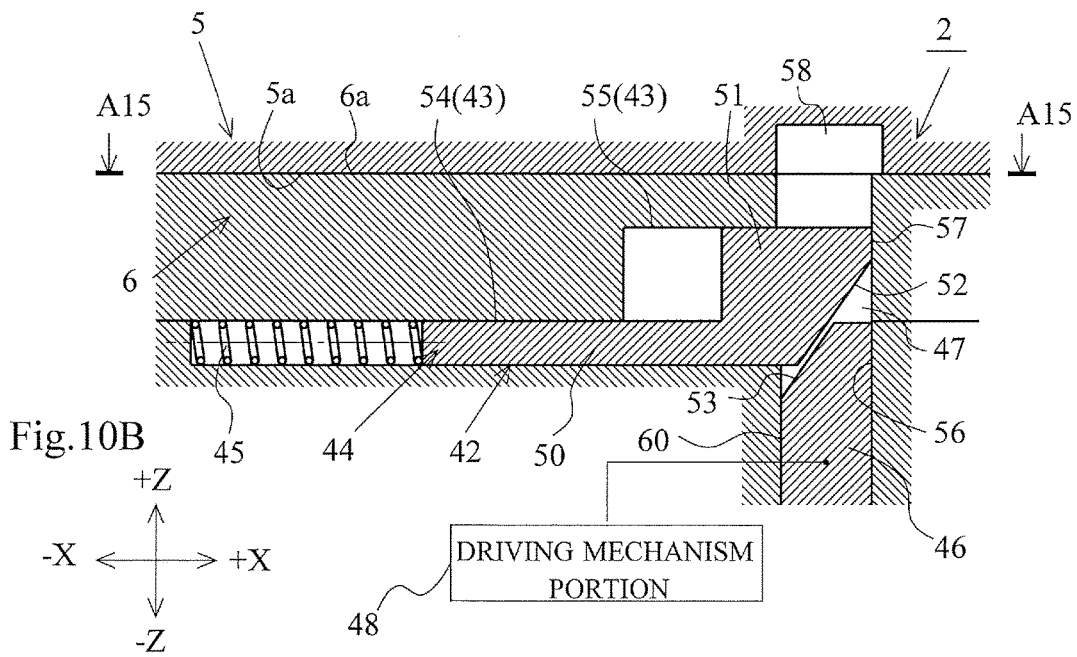
Figure 11A:
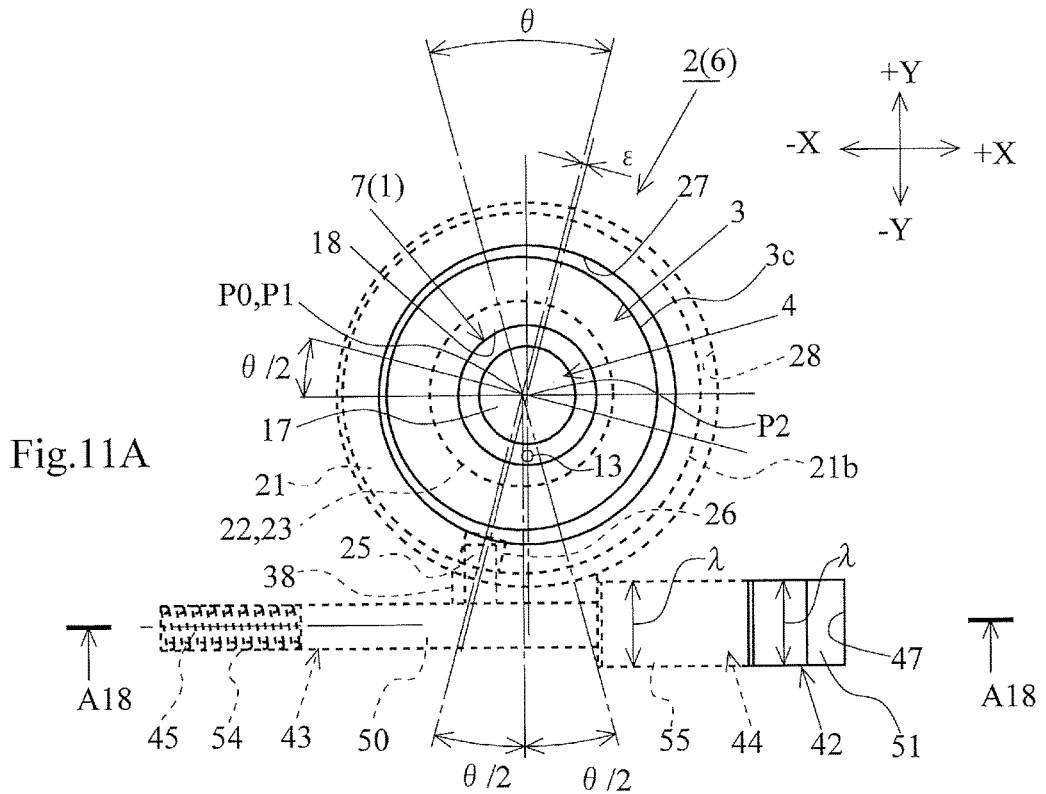
FIGS. 11A and 11B are drawings illustrating the structure of an injection molding mold according to the fourth embodiment of the present invention and are drawings illustrating the structure of the injection molding mold in the case where the external piece in the injection standby state in FIG. 10 is turned eccentrically with respect to the center pin clockwise by the predetermined angle.
Figure 11B:
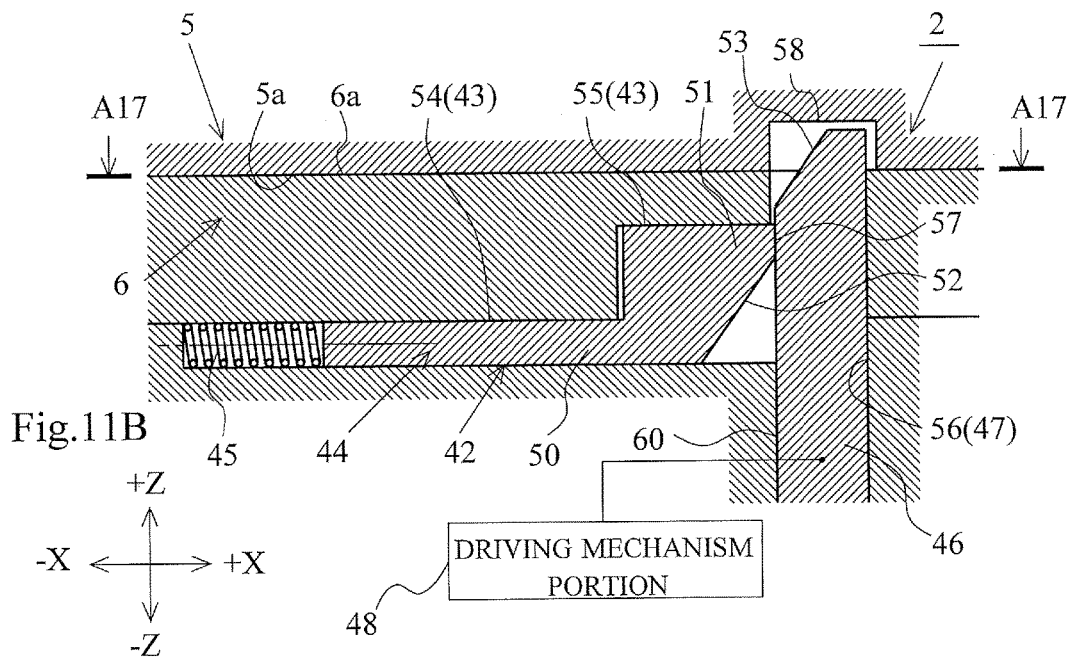
Figure 13:
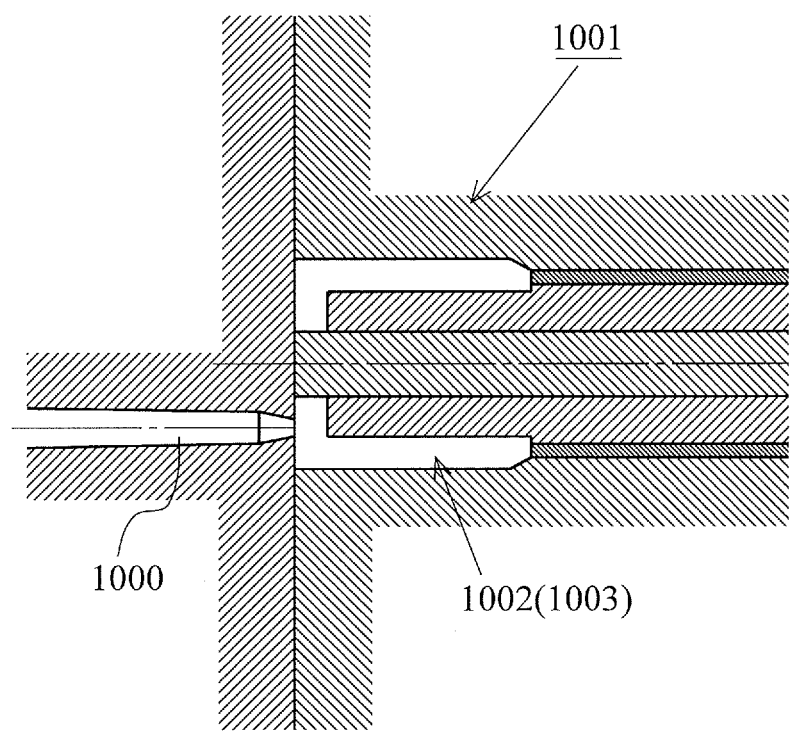
FIG. 13 is a drawing illustrating a structure of an injection molding mold for a cylindrical article according to a conventional example.
Figure 14:
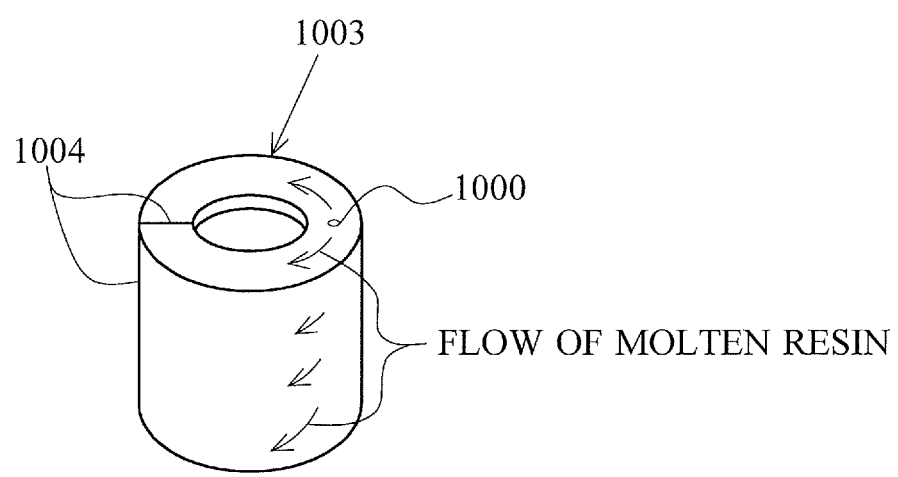
FIG. 14 is an external perspective view of the cylindrical article according to the conventional example.
Figure 15:
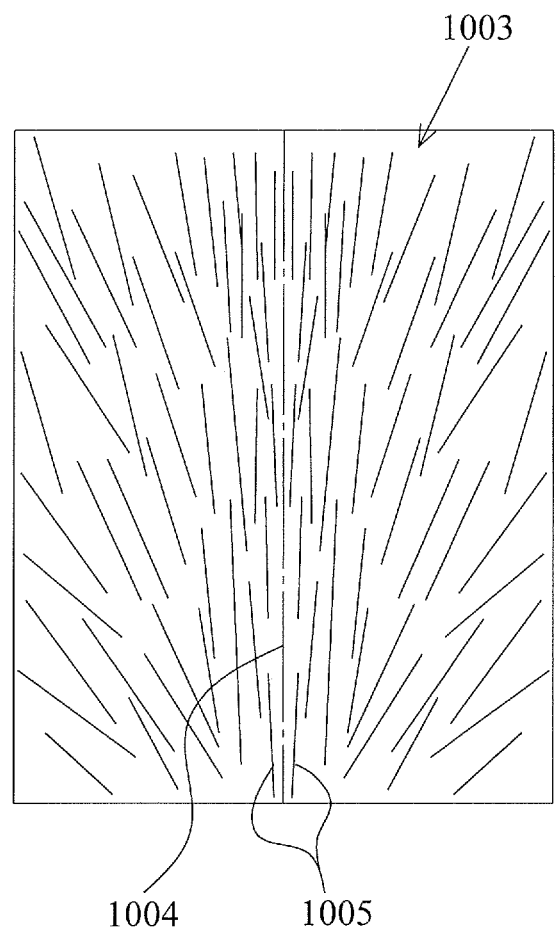
FIG. 15 is a drawing illustrating an orientation of reinforcing fibers at a weld line and near the weld line in the cylindrical article according to the conventional example.

FIG. 10 and FIG. 11 are drawings illustrating the injection molding mold 2 according to the fourth embodiment of the present invention and are drawings illustrating a modification of the rotational driving means 24 of the injection molding mold 2 according to the third embodiment. Among the drawings, FIGS. 10A and 10B are drawings illustrating the structure of the injection molding mold 2 in the injection standby state. FIGS. 11A and 11B are drawings illustrating the structure of the injection molding mold 2 in the case where the external piece in the injection standby state is turned eccentrically by the predetermined angle (θ) clockwise with respect to the center pin 4. FIG. 10A is a plan view of the second mold illustrating the injection molding mold illustrated in FIG. 10B taken along a line A15-A15. FIG. 10B is a cross-sectional view of the injection molding mold illustrated taken along a line A16-A16 in FIG. 10A. FIG. 11A is a plan view of the second mold illustrating the injection molding mold illustrated in FIG. 11B taken along a line A17-A17. FIG. 11B is a cross-sectional view of the injection molding mold illustrated taken along a line A18-A18 in FIG. 11A.

The injection molding mold 2 according to the embodiment is configured by replacing the rotational driving means 24 of the injection molding mold 2 according to the third embodiment by the rotational driving means 42 according to the second embodiment. The injection molding mold 2 is used for the injection molding of the cylindrical article 1 (the cylindrical article 1 illustrated in FIG. 9) similar to the injection molding mold 2 according to the third embodiment.

In the cylindrical article 1 injection-molded using the injection molding mold 2 according to the embodiment, similar to the cylindrical article 1 injection-molded using the injection molding mold 2 according to the third embodiment, the directions of the reinforcing fibers at the weld line 34 and near the weld line 34 are disturbed, and the reinforcing fibers at the weld line 34 and near the weld line 34 tangle. Therefore, the weld line 34 is less likely to be noticeable, improving the strength at the part where the weld line 34 is formed.

Fifth Embodiment (Injection Molding Mold for Cylindrical Article)

FIGS. 12A-12C are drawings illustrating the injection molding mold 2 for the cylindrical article 1 according to the fifth embodiment of the present invention. The injection molding mold 2 according to the embodiment illustrated in FIG. 12 is common with the injection molding molds 2 according to the first and the second embodiments in that the injection molding mold 2 is used to injection-mold the cylindrical article 1 illustrated in FIG. 4. FIG. 12(a) is a plan view (a plan view of a second mold 104) illustrated omitting a first mold 103 of the injection molding mold 2 illustrated in FIG. 12(c) and is a drawing illustrating a state (the injection standby state) where a center 162a of a slider 162 of an external piece 151 is displaced with respect to a center 150a of a center pin 150 by a predetermined dimension (e). FIG. 12(b) is a plan view of the second mold 104 and is a drawing illustrating the state where the center 162a of the slider 162 of the external piece 151 is matched with the center 150a of the center pin 150. FIG. 12(c) is a cross-sectional view of the injection molding mold 2 illustrated taken along a line A19-A19 in FIG. 12(a).

The injection molding mold 2 according to the embodiment illustrated in FIG. 12 forms a cavity 105 on a side of butt planes 103a and 104a of the first mold 103 and the second mold 104. The cavity 105 has a shape that shapes the cylindrical article 1 illustrated in FIG. 4 so as to be filled with the molten resin containing the reinforcing fibers. As illustrated in FIG. 4, the cylindrical article 1 includes the cylinder portion 8 and the hollow circular plate 10 formed integrally with one end of this cylinder portion 8. The cavity 105, which shapes this cylindrical article 1, includes a first cavity portion 108 to shape the cylinder portion 8 and a second cavity portion 110. The second cavity portion 110 is positioned at one end of the first cavity portion 108 to shape the hollow circular plate 10. This cavity 105 is formed in the second mold 104 such that the first mold 103 covers an opening end of the cavity 105.

The first mold 103 forms a gate 111 (pinpoint gate) open to the second cavity portion 110, which is formed at the second mold 104. In FIG. 12(a), this gate 111 is formed at the first mold 103 so as to be positioned on a center line 174 passing through the center 150a of the center pin 150 and extending along the X-axis direction. The second mold 104 includes the center pin 150, which is positioned on the inner peripheral surface side of the first cavity portion 108, and the external piece 151, which is positioned on the outer peripheral surface side of the first cavity portion 108. The outer peripheral surface of the center pin 150 shapes the inner peripheral surface side of the first cavity portion 108. An inner peripheral surface of a cavity forming hole 168 of the external piece 151 shapes the outer peripheral surface side of the first cavity portion 108. The second mold 104 includes a second mold body portion 152, an external piece support mold portion 153, which is disposed stacked on this second mold body portion 152, and an external piece pressing mold portion 154, which is disposed stacked on this external piece support mold portion 153.

The center pin 150 is a column-shaped part integrally formed with a distal end of a shaft portion 156 of an inner mold 155 and constitutes the inner mold 155 together with the shaft portion 156. At a distal end surface 157 of this center pin 150, a round-bar shaped protrusion 158 bumped against the butt plane 103a of the first mold 103 is formed. This protrusion 158 is integrally formed with the center of the distal end surface 157 of the center pin 150 so as to shape the center hole 16 of the hollow circular plate 10 of the cylindrical article 1 (see FIG. 4). An ejector sleeve 160 is fitted to the outer periphery of the shaft portion 156 of the inner mold 155 to be slidably movable.

The external piece 151 is housed in the second mold 104 to be slidably movable. The external piece 151 slidably moves along a plane perpendicular to a central axis 161 of the center pin 150 (a surface 152a of the second mold body portion 152). This external piece 151 includes a tubular slider 162, an operation rod 165, and a spring-retaining rod 167. The operation rod 165 is integrally formed with the outer peripheral side of this slider 162 and swingly contacts an outer peripheral surface (a cam surface) 164 of the cam 163. The spring-retaining rod 167 is integrally formed with the outer peripheral side of the slider 162 and pushes the operation rod 165 to the outer peripheral surface 164 of the cam 163 by the elastic force from a spring 166.

The slider 162 has a circular hole-shaped cavity forming hole 168 at the central portion. The shape in plan view has a width across flats like both sides of the cylindrical body being cut off. The cavity forming hole 168 is formed into a shape symmetrical with respect to a center line 170 passing through the center 162a and extending along the Y-axis (see FIG. 12(a)). Slide surfaces 171 extending along the Y-axis direction are formed on both sides of this slider 162 in the width direction (the direction along the X-axis). This slider 162 is housed in external piece guide holes 172 formed at the external piece support mold portion 153 and the external piece pressing mold portion 154. The slide surfaces 171 are slidably movable along slide guide surfaces 173 of the external piece guide holes 172. Here, the external piece guide hole 172 at the external piece support mold portion 153 has a shape identical to the external piece guide hole 172 at the external piece pressing mold portion 154 and the shape in plan view is the rectangular shape. The external piece guide holes 172 are formed into a shape symmetrical with respect to the center line 174, which passes through the center 150a of the center pin 150 and extends along the X-axis direction, and are also formed into a shape symmetrical with respect to the center line 170, which passes through the center 150a of the center pin 150 and extends along the Y-axis direction. The external piece guide holes 172 are formed to have a dimension with which the external piece guide holes 172 do not abut on the slider 162 in the case where the center 162a of the slider 162 (the center of the cavity forming hole 168) slidably moves from the position matching with the center 150a of the center pin 150 by the predetermined dimension (e). Optimal values are determined for a lift amount (e) of the cam 163 and a movement amount (e) of the slider 162 according to a thickness of the cylinder portion 8 of the cylindrical article 1, a difference in the material of the molten resin containing the reinforcing fibers, and a similar specification.

The operation rod 165 is formed on the one end side of the slider 162 along the Y-axis direction. Rounding a distal end of a round-bar shaped rod main body 165a extending along the Y-axis direction into a spherical surface forms a cam abutting surface 165b. This operation rod 165 is fitted to an inside of a first rod hole 175, which is formed on a side of a surface where the external piece support mold portion 153 and the external piece pressing mold portion 154 are stacked, to be slidably movable. The distal end side of the operation rod 165 projects to an inside of a cam housing hole 176 formed at the external piece support mold portion 153 and the external piece pressing mold portion 154, and the cam abutting surface 165b abuts the outer peripheral surface (the cam surface) 164 of the cam 163.

The spring-retaining rod 167 is formed on the other end side of the slider 162 along the Y-axis direction, extending in a direction opposite to the operation rod 165 extending direction. This spring-retaining rod 167 includes a round-bar shaped, small-diameter spring support rod portion 167a and a round-bar shaped, large-diameter (diameter larger than the spring support rod portion 167a) spring seat portion 167b. The spring support rod portion 167a is inserted in a space on an inner diameter side of the spring (the compression coil spring) 166. The one end side of the spring 166 abuts on the spring seat portion 167b. The spring seat portion 167b of the spring-retaining rod 167 is fitted to an inside of a second rod hole 177, which is formed on the side of the surface where the external piece support mold portion 153 and the external piece pressing mold portion 154 are stacked, to be slidably movable. The distal end side of the spring support rod portion 167a is fitted to an inside of a third rod hole 178, which is formed on the side of the surface where the external piece support mold portion 153 and the external piece pressing mold portion 154 are stacked, to be slidably movable. Here, the spring 166 is housed in a spring chamber 180, which is formed on the side of the surface where the external piece support mold portion 153 and the external piece pressing mold portion 154 are stacked. The spring chamber 180 is a circular hole-shaped space with an inner diameter size larger than an outer diameter size of the spring seat portion 167b and an outer diameter size of the spring 166 and houses the compressed spring 166. Then, the one end side of the spring 166 in its height direction abuts on the spring seat portion 167b. The other end side in the height direction abuts on an end surface 180a on the other end side (the third rod hole 178 side) of the spring chamber 180. Thus, the operation rod 165 is always pushed to the outer peripheral surface (the cam surface) 164 of the cam 163.

The cam 163 is turnably housed in a cam chamber 176 formed at the external piece support mold portion 153 and the external piece pressing mold portion 154. A camshaft 181 is turnably supported to the second mold body portion 152. Turning the camshaft 181 by rotational driving means 135 (for example, a stepping motor and rotational driving means constituted of a plurality of gears) allows this cam 163 to slidably move the external piece 151 by the lift amount (e) along the Y-axis direction. Consequently, the external piece 151 slidably moves between a position where the center 162a of the slider 162 (the center of the cavity forming hole 168) is displaced from the center 150a of the center pin 150 by the predetermined dimension (e) (the position illustrated in FIG. 12(a)) and the position where the center 162a of the slider 162 (the center of the cavity forming hole 168) matches the center 150a of the center pin 150 (the position illustrated in FIG. 12(b)).

With the injection molding mold 2 according to the above-described embodiment, the molten resin containing the reinforcing fibers is injected from the gate 111 into the cavity 105 in a state where the first mold 103 and the second mold 104 are bumped against one another and clamped. In this respect, as illustrated in FIG. 12(a), the external piece 151 is held at the position displaced with respect to the center pin 150 by the predetermined dimension (e). In this respect, the weld line 34 is generated at the joining portion of the molten resins containing the reinforcing fibers in the cavity 105 (see FIG. 4). Here, the joining portion of the molten resins containing the reinforcing fibers in the cavity 105 is disposed at a position on the center line 174 rotated from an opening position of the gate 111 by 180° around the center 150a of the center pin 150. When the molten resin containing the reinforcing fibers is filled in the whole region in the cavity 105 and before the molten resin containing the reinforcing fibers cools and loses the fluidity, the rotational driving means 135 is operated. When the cam 163 is turned by a predetermined angle (180°) by the rotational driving means 135, the external piece 151 slidably moves while compressingly pressing the spring 166 (see FIG. 12(b)) until the center 162a of the slider 162 (the center of the cavity forming hole 168) matches the center 150a of the center pin 150. This changes the interval between the outer peripheral surface of the center pin 150 and the inner peripheral surface of the cavity forming hole 18 of the injection molding mold 2. Accordingly, the cavity width (W) changes and the molten resin containing the reinforcing fibers in the cavity 105 is forcibly caused to flow into the cavity 105. Consequently, the orientations of the reinforcing fibers of the molten resin containing the reinforcing fibers in the cavity 105 are disturbed, thus the reinforcing fibers at the weld line 34 and around the weld line 34 tangle (see FIG. 4).

Afterwards, when the molten resin containing the reinforcing fibers in the cavity 105 cools and hardens and the cylindrical article 1 is shaped, the first mold 103 and the second mold 104 of the injection molding mold 2 are separated (the molds are opened). The ejector sleeve 160 extrudes the cylindrical article 1 in the cavity 105 to the outside of the cavity 105. Thus, the injection-molded cylindrical article 1 is taken out from the inside of the cavity 105 of the injection molding mold 2.

With the injection molding mold 2, after the cylindrical article 1 is taken out from the inside of the cavity 105, the rotational driving means 135 is operated. When the cam 163 is turned by the rotational driving means 135, the external piece 151 pressed to the cam 163 by the spring 166 is returned from the position in FIG. 12(b) to the initial position of FIG. 12(a) (the position in the injection standby state) to prepare for the next injection molding.

With the injection molding mold 2 according to the above-described embodiment, the directions of the reinforcing fibers at the weld line 34 and near the weld line 34 in the injection-molded cylindrical article 1 are disturbed. The reinforcing fibers at the weld line 34 and near the weld line 34 in the cylindrical article 1 tangle. Accordingly, the weld line 34 in the cylindrical article 1 is less likely to be noticeable, and the strength at the part where the weld line 34 is formed in the cylindrical article 1 is improved.

(Injection Molding Method of Cylindrical Article)

The following describes the injection molding method of the cylindrical article 1 using the injection molding mold 2 according to the embodiment.

As illustrated in FIGS. 12(a) and 12(c), the injection molding mold 2 is held in a state (the injection standby state) where the external piece 151 (the center 162a of the slider 162 and the center of the cavity forming hole 168) of the second mold 104 is displaced by the predetermined dimension (e) with respect to the center pin 150 (the center 150a of the center pin 150), and the first mold 103 and the second mold 104 are bumped against one another to clamp the molds. Afterwards, the molten resin containing the reinforcing fibers is injected from the gate 111 into the cavity 105 (the first step of the injection molding). In this respect, the molten resins injected from the gate 111 into the cavity 105 join together at a position circumferentially rotated by 180° from the gate 111. The weld line 34 is formed at the part where the molten resins containing the reinforcing fibers join together (see FIG. 4).

With the injection molding mold 2, when the molten resin containing the reinforcing fibers is filled in the whole region in the cavity 105 and before the molten resin containing the reinforcing fibers filled in the cavity 105 deteriorates the fluidity, the cam 163 is turned by the predetermined angle (θ) by the rotational driving means 135. The external piece 151 is slidably moved from the position in FIG. 12(a) to the position in FIG. 12(b). Thus, the center 162a of the slider 162 (the center of the cavity forming hole 168) of the external piece 151 matches the center 150a of the center pin 150 (the second step of the injection molding). Then, the molten resin containing the reinforcing fibers in the cavity 105 is forcibly caused to flow in the circumferential direction of the cavity 105 according to the change in the clearance formed between the external piece 151 and the center pin 150. Consequently, the orientations of the fibers of the molten resins containing the reinforcing fibers at the weld line 34 and around the weld line 34 are disturbed in the cavity 105, and the reinforcing fibers at the weld line 34 and around the weld line 34 tangle, making the weld line 34 less noticeable.

With the injection molding mold 2, after the molten resin containing the reinforcing fibers in the cavity 105 cools and hardens, the first mold 103 and the second mold 104 are separated (the molds are opened). In this respect, the cylindrical article (the injection molded product) 1 in the cavity 105 on the second mold 104 side and the gate 111 on the first mold 103 side are separated. The separation mark 41 of the gate 111 is formed on the external surface of the hollow circular plate 10 of the cylindrical article 1 (the third step of the injection molding).

Next, the cylindrical article 1 in the cavity 105 is extruded to the outside of the cavity 105 by the ejector sleeve 160. Thus, the injection-molded cylindrical article 1 is taken out from the inside of the cavity 105 (the fourth step of the injection molding).

With the injection molding method according to the embodiment, the directions of the reinforcing fibers at the weld line 34 and near the weld line 34 in the injection-molded cylindrical article 1 are disturbed. The reinforcing fibers at the weld line 34 and near the weld line 34 in the cylindrical article 1 tangle. Accordingly, the weld line 34 in the cylindrical article is less likely to be noticeable, and the strength at the part where the weld line 34 is formed in the cylindrical article 1 is improved (see FIG. 4).

The injection molding mold 2 according to the embodiment changes the shape of the cavity 105 according to the shape of the cylindrical article 1 illustrated in FIG. 9 and the gate 111 is opened to the cavity 105. Accordingly, similar to the injection molding mold 2 according to the third and fourth embodiments, the cylindrical article 1 illustrated in FIG. 9 can be injection-molded.

Other Embodiments

The gates 13 and 111 of the injection molding mold 2 according to the respective embodiments can disturb the directions of the reinforcing fibers at the weld line 34 and near the weld line 34. As long as the strength at the weld line 34 in the cylindrical article 1 can be improved, the opening positions to the cavities 7 and 105 may be displaced.

While the first and the second and the fifth embodiments describe the aspect of the uniform thicknesses of the cylinder portion 8 and the hollow circular plate 10 in the cylindrical article 1 as the example, the thickness of the cylinder portion 8 and the thickness of the hollow circular plate 10 in the cylindrical article 1 may be changed. While the third and the fourth embodiments describe the aspect of the uniform thickness of the cylindrical article 1 as the example, the thickness of the cylindrical article 1 may be changed.

REFERENCE SIGNS LIST

1 Cylindrical article
2 Injection molding mold
3, 151 External piece
4, 150 Center pin
7, 105 Cavity
13, 111 Gate (pinpoint gate)
34 Weld line

The invention claimed is:

1. An injection molding mold for a cylindrical article where a molten resin containing reinforcing fibers is injected from a gate into a cavity to join the molten resins containing the reinforcing fibers together in the cavity to form a weld line, the injection molding mold for the cylindrical article comprising:

a center pin for shaping an inner peripheral surface side of the cylindrical article; and an external piece for shaping an outer peripheral surface side of the cylindrical article, wherein:

the cavity is formed between the center pin and the external piece, and the external piece is movable with respect to the center pin to change an interval between the external piece and the center pin, to forcibly cause the molten resin containing the reinforcing fibers in the cavity to flow, and to disturb directions of the reinforcing fibers at the weld line.

2. The injection molding mold for the cylindrical article according to claim 1, wherein the external piece is configured to be slidably moved along a plane perpendicular to a central axis of the center pin.

3. The injection molding mold for the cylindrical article according to claim 1, wherein the external piece is configured to be eccentrically turned with respect to a central axis of the center pin.

4. The injection molding mold for the cylindrical article according to claim 3, wherein:

the cavity includes a cavity portion for shaping a cylinder portion of the cylindrical article, the cavity portion has an inner peripheral surface shaped by an outer peripheral surface of the center pin, the cavity portion having an outer peripheral surface shaped by an inner peripheral surface of a cavity forming hole of the external piece, and the external piece is configured to be moved with respect to the center pin to move a center of the cavity forming hole of the external piece from a position displaced with respect to the central axis of the center pin to a position where the center of the cavity forming hole matches the central axis of the center pin.

5. The injection molding mold for the cylindrical article according to claim 4, wherein:

the gate is configured to perform the injection at a position on a side where an interval between an inner peripheral surface and the outer peripheral surface of the cavity portion is narrowest at a position where the center of the cavity forming hole is displaced with respect to the central axis of the center pin most, and the weld line is formed at a position where the interval between the inner peripheral surface and the outer peripheral surface of the cavity portion is widest at the position where the center of the cavity forming hole is displaced with respect to the central axis of the center pin most.

6. An injection molding method for forming a cylindrical article, the injection molding method for the cylindrical article comprising:

injecting a molten resin containing reinforcing fibers from a gate into a cavity to join molten resins containing the reinforcing fibers together in the cavity to form a weld line;

installing a center pin shaping an inner peripheral surface side of the cylindrical article and an external piece shaping an outer peripheral surface side of the cylindrical article;

forming the cavity between the center pin and the external piece; and moving the external piece with respect to the center pin to change an interval between the external piece and the center pin, to forcibly cause the molten resin containing the reinforcing fibers in the cavity to flow, and to disturb directions of the reinforcing fibers at the weld line.

7. A cylindrical article made of a fiber-reinforced resin material and formed by injecting a molten resin containing reinforcing fibers from a gate into a cavity of an injection molding mold having a center pin shaping an inner peripheral surface side of the cylindrical article, and an external piece shaping an outer peripheral surface side of the cylindrical article, the cavity being formed between the center pin and the external piece, and the external piece being moved with respect to the center pin to change an interval between the external piece and the center pin to forcibly cause the molten resin containing the reinforcing fibers in the cavity to flow while disturbing directions of the reinforcing fibers at the weld line, said cylindrical article comprising:

a cylindrical portion; and a hollow circular plate at an end of said cylindrical portion;

wherein said cylindrical portion and said hollow circular plate are made of a resin containing reinforcing fibers and have a weld line; and wherein orientations of the reinforcing fibers in the resin at the weld line are disturbed by the movement of the external piece with respect to the center pin such that the reinforcing fibers at the weld line are tangled.

* * * * *